United States Patent
Cheatham, III et al.

(10) Patent No.: US 12,176,117 B2
(45) Date of Patent: Dec. 24, 2024

(54) THERMAL ENERGY STORAGE SYSTEM CONNECTED TO BOTH A NUCLEAR REACTOR AND A POWER GENERATOR

(71) Applicant: TerraPower, LLC, Bellevue, WA (US)

(72) Inventors: Jesse R. Cheatham, III, Seattle, WA (US); Robert A. Corbin, North Bend, WA (US); John R. Gilleland, Kirkland, WA (US); Pavel Hejzlar, Kirkland, WA (US); Kevin Kramer, Redmond, WA (US); Christopher A. Martin, Seattle, WA (US); Brian Morris, Bellevue, WA (US); Robert C. Petroski, Seattle, WA (US); Philip M. Schloss, Seattle, WA (US); Joshua C. Walter, Kirkland, WA (US); Mark R. Werner, Bellevue, WA (US)

(73) Assignee: TERRAPOWER, LLC, Bellevue, WA (US)

( * ) Notice: Subject to any disclaimer, the term of this patent is extended or adjusted under 35 U.S.C. 154(b) by 978 days.

(21) Appl. No.: 17/023,230

(22) Filed: Sep. 16, 2020

(65) Prior Publication Data
US 2021/0095645 A1    Apr. 1, 2021

Related U.S. Application Data

(63) Continuation-in-part of application No. PCT/US2020/028011, filed on Apr. 13, 2020.
(Continued)

(51) Int. Cl.
*G21D 9/00* (2006.01)
*F01K 3/18* (2006.01)
(Continued)

(52) U.S. Cl.
CPC .............. *G21D 9/00* (2013.01); *F01K 3/181* (2013.01); *F28D 20/00* (2013.01); *G21D 1/00* (2013.01); *Y02E 30/00* (2013.01)

(58) Field of Classification Search
CPC .. G21D 9/00; G21D 1/00; F01K 3/181; F03G 7/00; F28D 20/00
(Continued)

(56) References Cited

U.S. PATENT DOCUMENTS

2012/0207261 A1    8/2012    Noel
2017/0178757 A1    6/2017    Hough et al.
(Continued)

FOREIGN PATENT DOCUMENTS

CN    102985979 A    3/2013
CN    105551546 A    5/2016
(Continued)

OTHER PUBLICATIONS

Green, "Nuclear hybrid energy system: molten salt energy storage", INL/EXT-13-31768, Idaho National Laboratory, USA, (2013). (Year: 2013).*
(Continued)

*Primary Examiner* — Jack W Keith
*Assistant Examiner* — Daniel Wasil
(74) *Attorney, Agent, or Firm* — FisherBroyles, LLP; Jeremy P. Sanders

(57) ABSTRACT

An integrated energy system includes a nuclear thermal plant situated on a nuclear site. The nuclear thermal plant produces thermal energy that is transported to a thermal energy storage system located outside the nuclear site. The thermal storage system is thermally coupled to a power generation system which is also remote to the nuclear site. By this arrangement, the nuclear thermal plant is isolated and decoupled from the power generation system. The
(Continued)

nuclear thermal plant may supply thermal energy upwards of 800° C. or more to be stored at the thermal energy storage system until needed such as for industrial heat, power generation, or other uses. The thermal storage system is source agnostic, and one or more additional thermal energy generators, such as additional nuclear reactors, solar thermal plants, or other thermal energy generators can be coupled to a common thermal storage system and power generation system.

14 Claims, 18 Drawing Sheets

Related U.S. Application Data

(60) Provisional application No. 62/986,902, filed on Mar. 9, 2020, provisional application No. 62/929,003, filed on Oct. 31, 2019, provisional application No. 62/833,623, filed on Apr. 12, 2019.

(51) Int. Cl.
*F28D 20/00* (2006.01)
*G21D 1/00* (2006.01)

(58) Field of Classification Search
USPC .......................................................... 376/322
See application file for complete search history.

(56) References Cited

U.S. PATENT DOCUMENTS

| | | | |
|---|---|---|---|
| 2017/0309354 A1* | 10/2017 | Kim | G21D 1/006 |
| 2018/0137944 A1* | 5/2018 | Abbott | G21C 15/26 |
| 2020/0135345 A1* | 4/2020 | Kutsch | G21D 9/00 |

FOREIGN PATENT DOCUMENTS

| | | |
|---|---|---|
| CN | 108799026 A | 11/2018 |
| CN | 109026239 A | 12/2018 |
| RU | 2453938 C1 | 6/2012 |
| RU | 2680380 C1 | 2/2019 |

OTHER PUBLICATIONS

Petrovic, "NuRenew—An Advanced Hybrid Nuclear-Renewable Energy Park", Georgia Institute of Technology, pp. 162-165, May 2016. (Year: 2016).*

El-Genk, "SLIMM—Scalable Liquid Metal cooled small Modular Reactor: Preliminary design and performance analyses", Progress in Nuclear Energy 85 (2015): 56-70. (Year: 2015).*

Mendez, "Enabling Technologies for Ultra-Safe and Secure Modular Nuclear Energy", No. SAND2016-5936R. Sandia National Lab. (SNL-NM), Albuquerque, NM (United States), 2016. (Year: 2016).*

Kennedy, "Special Purpose Application Reactors: Systems Integration Decision Support", No. INL/EXT-18-51369-Rev001. Idaho National Lab.(INL), Idaho Falls, ID (United States), 2018. (Year: 2018).*

Carlson et al., "Model of the impact of use of thermal energy storage on operation of a nuclear power plant Rankine cycle", Energy Conservation and Management, Nov. 23, 2018, pp. 36-47, vol. 181.

Frick et al., "Design and Operation of a Sensible Heat Peaking Unit for Small Modular Reactors", Idaho National Laboratory, Aug. 2018, pp. 415-441, vol. 205, No. 3, http://www.inl.gov.

Bragg-Sitton et al., "Nuclear-Renewable Hybrid Energy Systems: 2016 Technology Development Program Plan", Idaho National Laboratory (INL), Idaho Falls, ID, INL/EXT-16-38165, Mar. 2016, 122 pages.

Charles Forsberg, "Light Water Reactor Heat Storage for Peak Power and Increased Revenue: Focused Workshop on Near-Term Options", CANES, Jul. 2017, MIT-ANP-TR-170, 144 pages.

* cited by examiner

THERMAL ENERGY STORAGE SYSTEM CONNECTED TO BOTH A NUCLEAR REACTOR AND A POWER GENERATOR

CROSS-REFERENCE TO RELATED APPLICATIONS

This application claims the benefit under 35 U.S.C. § 119(e) of U.S. Provisional Application No. 62/986,902, filed Mar. 9, 2020, and U.S. Provisional Application No. 62/929,003, filed Oct. 31, 2019, and this application is a continuation-in-part of PCT/US2020/028011, filed Apr. 13, 2020, which claims the benefit under 35 U.S.C. § 119(e) of U.S. Provisional Application No. 62/833,623, filed Apr. 12, 2019, all of which are entitled "NUCLEAR THERMAL PLANT WITH LOAD-FOLLOWING POWER GENERATION," the disclosures of which are incorporated, in their entirety, by this reference.

BACKGROUND

The field of the present disclosure is related to nuclear reactors, and more specifically, to nuclear reactors for generating heat with improved safety and load-following ability.

Prior methods and systems for generating electricity from a nuclear reactor require that a nuclear reactor undergo significant planning, building, and regulatory licensing of the nuclear island prior to start-up of the reactor. The nuclear reactor is connected to a power cycle for converting nuclear thermal energy into electricity, typically by a steam turbine using water as the working fluid. While nuclear reactors operating this way have been around for decades, the typical setup has several drawbacks.

For instance, the nuclear island, which includes the reactor area, the fuel handling systems, and the energy conversion systems is usually operated at high temperature and pressures, which necessitates large containment structures. In addition, the structure located on the nuclear island must also be inspected and be granted a nuclear license by the regulatory authority in order to operate, which is a lengthy and costly endeavor.

Moreover, the reactor is subject to balance of plant trips in which malfunctioning equipment causes an automatic nuclear plant shutdown. Finally, a nuclear power plant is not designed for rapid changes in output and is thus not able to efficiently follow the load demand from the electrical grid.

While nuclear plants offer numerous and significant advantages over other forms of electricity generation, it would be desirable to provide improvements that result in a safer, more flexible, and efficient system for generating, storing, and converting thermal energy, as well as other features that will become apparent from the following description.

SUMMARY

According to some embodiments, a nuclear power plant can be reconfigured, rearranged, and operated as a nuclear thermal plant which provides numerous advantages. For instance, a nuclear power plant can be reconfigured and operated to provide thermal energy, which can be transported off-site to a thermal storage system. The thermal storage system, in turn, can be coupled to an energy conversion plant that converts the thermal energy into industrial heat, electricity, or some other useful purpose. By decoupling the nuclear reactor from the balance of plant, including the energy conversion system, there are many advantages that can be realized.

For example, the regulatory licensing can be performed much more efficiently when there is less equipment installed on the nuclear island. In some nuclear reactors, the coolant is provided by a liquid metal, such as sodium. When sodium encounters water, the resulting reaction is exothermic and energetic, and safety systems must be in place to inhibit this reaction and to contain this reaction should it happen. By providing the steam plant remotely from the reactor, the reactor is thereby isolated from any water-containing systems that may typically be used in conjunction with a nuclear power plant.

Additionally, multiple nuclear thermal plants can be coupled to a shared thermal storage system, which provides advantages in terms of cost and time to construct, ease of maintenance as one or more reactors can be shut down without affecting the entire nuclear thermal plant, and a nuclear thermal plant can effectively deliver more energy during a high demand period of time than it could deliver if it were coupled directly to an energy conversion system.

The following description provides concepts that offer breakthrough potential for the economics of a sodium reactor plant, as well as nuclear reactor plants using other fuels, coolants, and technologies. These breakthroughs can come from reimagining the technology to drive down costs and schedule uncertainty or by expanding revenue streams such as by supplying both electricity and heat to consumers. In addition to the economic advantages, ensuring capability to solve policy problems (Grid reliability, weapons proliferation resistant, exportable, easily site-able, etc.) factors in to allow the benefits to be realized.

BRIEF DESCRIPTION OF THE DRAWINGS

A better understanding of the features, advantages and principles of the present disclosure will be obtained by reference to the following detailed description that sets forth illustrative embodiments, and the accompanying drawings of which.

DETAILED DESCRIPTION

Figure 1:
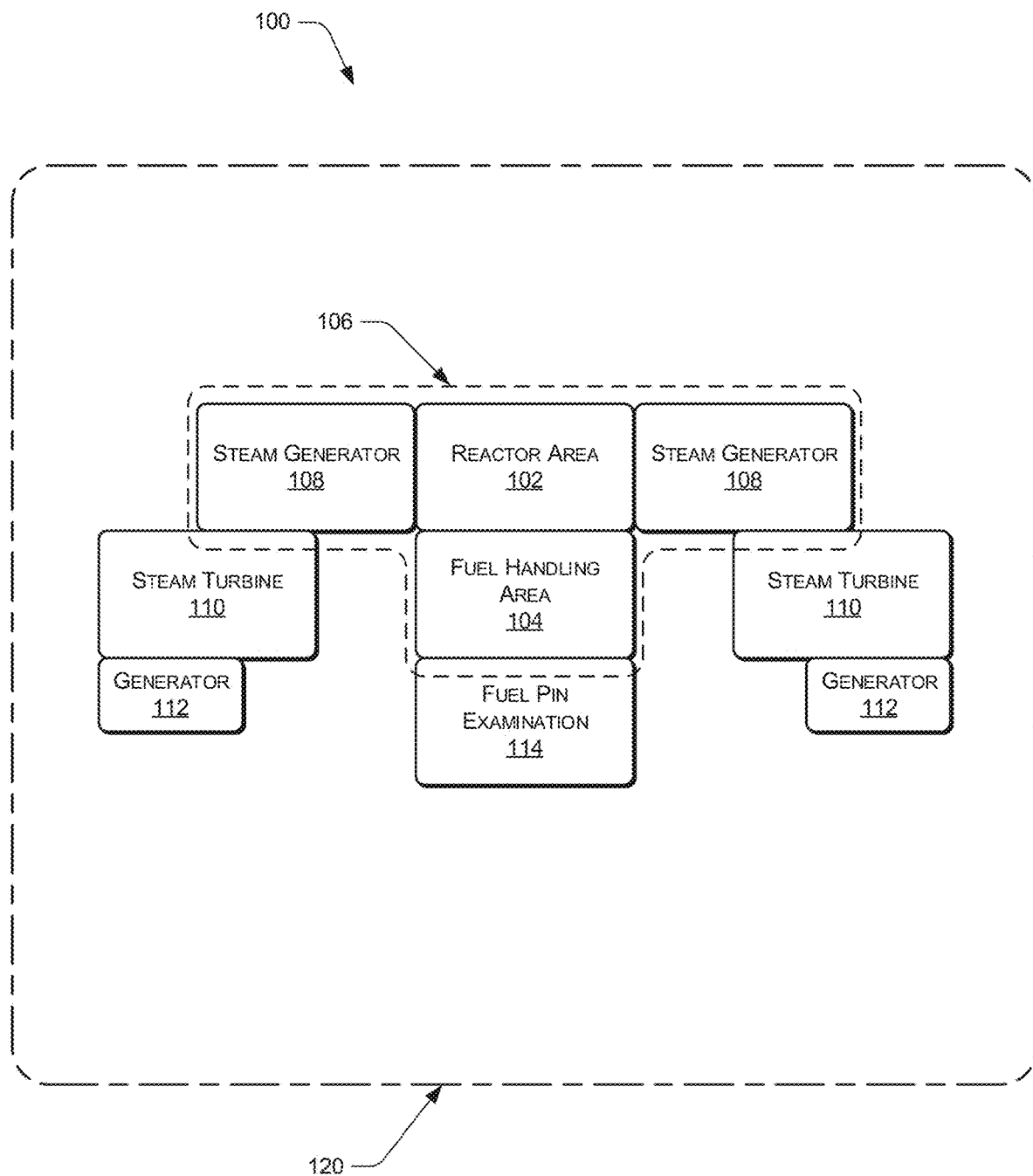
FIG. 1 shows a typical nuclear power plant.

The following detailed description provides a better understanding of the features and advantages of the inventions described in the present disclosure in accordance with the embodiments disclosed herein. Although the detailed description includes many specific embodiments, these are provided by way of example only and should not be construed as limiting the scope of the inventions disclosed herein.

While the cost of nuclear energy is important and deserves attention, the revenue side and policy side of nuclear equally deserve focus. The cost of nuclear has been an important metric in describing the commercial attractiveness while entering into a highly regulated, commoditized market of baseload power generation. Finding approaches to reduce regulatory burden and broaden commercial market opportunities is a key to breakthrough economic changes that increase revenues for modest cost increases. Enabling technical solutions for policy problems also has a strategic value that is hard to capture in overnight construction cost considerations. Leveraging currently undervalued attributes like no CO2 emissions with a capability to integrate with an increasingly dynamic electric grid will become more valuable in the coming decades.

Besides the operational cost challenges for load following with nuclear energy, base-load power generation does not have the ability to revenue follow as prices for electricity vary through the day like "peaker" plants (e.g. power plants that may only run when there is a high, or peak, demand). To improve the competitiveness of nuclear power in the changing energy landscape, technology and process innovations are needed to allow nuclear power to operate at full capacity and access market arbitrage opportunities in addition to full power electricity production. At the time when electricity prices are below cost of production due to intermittent renewables, nuclear power plants need an alternative production avenue in lieu of load following electricity demand alone. This fundamentally requires an understanding of the competitive advantages of nuclear plants compared to intermittent renewable energy sources. These competitive advantages lead to a desire and opportunity for co-location with other industrial processes to achieve economies of concentration in energy production and manufacturing processes.

One of the distinguishing characteristics for nuclear power, compared to wind, solar, and other renewables, is concentrated shaft power prior to electricity production and thermal outputs. Leveraging these differences can define competitive advantages during times of low-price energy production to either store energy more efficiently or make another saleable product. Many power production facilities rely on a steam Rankine cycle to convert thermal energy into electricity. While conversion of shaft power to electricity in a rotary generator is highly efficient (98-99%), converting from electricity back to shaft power is slightly less efficient (~95%). Additional losses occur at stepping up voltage for transmission, transmission over power lines, and stepping down voltage for local consumption. The exact losses from transmission to consumption are location and distance specific but the overall estimated losses from nuclear plant power production to consumption of power at a site are estimated at 2-4% for this example. The combined efficiency losses shows direct shaft power has 8-11% efficiency gain compared to electrical production to shaft power at another location. As a result, there is a potential competitive edge arbitrage between electrical power production and direct shaft power work with a sufficiently capable clutch and gearing system. The clutch and gearing system would be capable of fully or partially translating the shaft power to non-electrical production work. The challenge is in the start/stop applications up to Giga-watt scale and their respective product mass flow rates to support the massive workload.

One such example would be using Compressed Air Energy Storage (CAES) or Liquified Air Energy Storage (LAES) to allow nuclear power plants to operate at full capacity during low electricity prices (and consequently, low electricity demand) by providing the shaft power to liquefy air in addition to supplying the base load electricity needs. Stored at atmospheric pressure, the cryogenic liquefied air can later be boiled off with the nuclear waste heat to drive a turbine for power generation. CAES and LAES are estimated to scale to GW-hr scale storage, and represents a significant capability for power management. The stored liquefied air can then drive a turbine during peak electricity prices to move nuclear away from only baseload pricing. Due to the scalability of the CAES and LAES technology and the technical maturity of large cryogenic storage tanks, there is an opportunity to combine the nuclear power's concentrated shaft power for the cryogenic cooling and waste heat to boil the liquefied air to drive a turbine. This combination of capabilities will be more effective than the electrically driven pumping requirements and 'heat storage' needs of the currently proposed CAES and LAES technologies giving the joint technology a competitive edge compared to either technology by itself. This technology, with appropriate development, could be retrofitted onto the current United States nuclear fleet that produces 99 GW electric.

While the most likely use of CAES and LAES will be for energy production, a more selective distillation of the liquefied compressed air could also give high quality streams of gases as a saleable product. An example would be selling pure oxygen streams through temperature distillation for medical uses or power production for companies that hope to simplify carbon capture by removing NOX and SOX complications by only combusting natural gas and oxygen. This opens the possibility of co-siting natural gas power plants with CAES-Nuclear plants to simplify carbon sequestration. The remaining distilled gases could be provided for their cold temperature value, specific gas value, or be consumed in a turbine to produce electricity, for example.

Another similar application for shaft power in the United States is the Liquefied Natural Gas (LNG) export market which continues to increase in demand, and reached about 8.9 billion cubic feet a day by in 2019. Currently, up to 10% of the feed gas for liquefaction is consumed in the process. Using the more conservative estimate for the liquefaction process of 4100 kj/kg, about 230 GWh of energy is required per year to support the current liquefaction process. Nuclear power plants could play a significant role in increasing LNG exports to the rest of the world either through direct compression or through combination with the CAES energy storage using the cold CAES on one side of the heat exchanger and natural gas on the other. In this combined system, the natural gas liquefies for storage or export while the compressed air boils to turn an electrical turbine. In either case, air and natural gas can be brought to the power plant and processed easily and is relatively amenable to 'start—stop' operations to accommodate load following.

Another fluid pumping example is massively pumped hydro power/aquifer renewing as a reasonable start/stop application. Assuming that the market price signals will develop in the next decade to warrant massive water pumping efforts and associated pipelines, efficiency gains using direct shaft power for aquifer renewing could be upwards of seven quads (i.e., one quad is $10^{15}$ BTU, or $1.055 \times 10^{18}$ joules) or greater per year. Presumably, water reclamation efforts will reduce the required pumping effort but likely not eliminate replacement water needs. In addition, this pumping effort also represents a massive 'pumped hydro' capability that could be run in reverse along a pipeline to supplement intermittent power sources and refill local aquifers.

As previously stated, the concentrated shaft power is only one of the distinguishing characteristics of nuclear power compared to solar, wind, and other renewable power options. Industrial processes to make products like refined oil, coke and steel, chemicals, cement, etc. require both energy and a specific temperature. This minimum temperature requirement for a chemical process to occur is a key differentiator on what primary energy source is best. While the primary heat consumption is specific to a single market, the temperature requirements for the given process are universally required. Although there is a spectrum of temperature requirements for processes, the main interesting temperatures appear to be 100-250 Celsius with steam and hot water production, refining (petrochemical) processes in the 250-550 Celsius range, and high temperature processes for cement, iron, steel, and glass production at >1000 Celsius. Looking at the broader energy market as a whole, petroleum refining consumes over 6 quads a year and forestry products consume a little over 3 quads a year.

Fossil fuels currently meet both the scale of energy demand and the temperature. In a decarbonized energy world, finding the best way to substitute the utility and versatility of fossil fuels is a challenge. In the case of wind, solar, and hydro-power, they can generate substantial amounts of energy, but they do not generate substantial amounts of high-quality heat. These energy sources must undergo another energy conversion to make higher quality process heat. The additional steps like resistive heaters or hydrogen production with blast furnaces will need to be included for pricing these energy sources. There may be an additional energy storage requirement as well to achieve high capacity factors for running the industrial equipment 24 hours a day or acceptance of 'lost opportunity' with low capacity factor plants.

By competing on heat and not electricity, a nuclear power plant has price competition based on $/MMBTU at temperature vs. $/KWe converted to the needed temperature. One of the most obvious starting competition points is direct steam production and consumption. Forestry products consume 1.3 quads of steam per year representing over 45 GWth of nuclear power plants operating around the clock simply for the process steam. In the production of forestry products, part of the process creates waste products like Black Liquor (e.g., waste product from the kraft process when digesting pulpwood into paper pulp removing lignin, hemicelluloses and other extractives from the wood to free the cellulose fibers), biomass and other residual fuels which are burned for process heat to make steam. The remainder of required fuel is currently supplemented by coal or natural gas. Using nuclear power for steam liberates the 1330 TBtu (1.3 quads) of primary energy to be used in other high temperature applications like petroleum refineries or cement applications. By utilizing nuclear thermal energy to provide high quality process heat for the forestry industry, the recovered forestry product energy could supply the energy requirements for both cement and glass manufacturing in the United States (combined less than 1 quad) with energy to spare. The burning of forestry products is considered a carbon neutral activity and therefore allows a nuclear substitution of steam production to directly support high temperature processes. While there is a large degree of flexibility in the fuel source for cement production, ensuring that the forestry fuel products can be transported and used in other primary heat applications may require technology innovations. Similar to forestry products, the overall chemical manufacturing industry consumes 1.2 quads of steam that could be directly substituted with nuclear power created steam. However, this energy displacement does not completely free up a renewable fuel source but simply reduces the required amounts of natural gas and coal to drive the process, even where renewables are also burned to support their conversion to products.

Another nuclear created steam use could be the combination of a nuclear plant that produces steam for hydrogen-electrolysis while intermittent power sources produce cheap electricity and electricity when intermittent power sources are off. As the temperature of steam increases, there is a smaller required amount of electricity to conduct the electrolysis. However, the gains on electricity efficiency with higher temperatures may not be economically interesting in a world where peak intermittent power generation drives the cost of electricity to 'too cheap to meter' levels. If the cost of the electrolysis equipment can be cheaply integrated into a steam bypass pipeline, then the nuclear reactor could readily transition, in part or in full, to electrolysis during low value electricity times. This allows nuclear plants to compete on heat production during low electricity prices and on electricity during higher electricity prices. The resulting hydrogen production should not be viewed only as an energy storage mechanism but more as the source of >1000 Celsius industrial heat needs, such as for cement, iron, steel, and glass.

In the case of advanced nuclear reactors that have a higher outlet temperature, more direct industrial process opportunities become available. For example, the higher reactor outlet temperature can be used as a pre-heater for other industrial processes or the primary heat supply for a chemical process. In the case of petroleum refining, there is a significant energy demand in the distillation and cracking of hydrocarbons requiring over 6 quads of energy. A sodium-cooled reactor could be the primary heat source for a number of the lower temperature cracking processes and the reactor heat can also be 'boosted' to the required peak refinery temperatures with electrical heating or small amounts of fossil fuels. Much of the technical challenge in this case is to minimize the number of heat exchangers/losses during heat exchange as well as establishing the technology for refineries to accept temperature and energy inputs other than oil, electricity, and steam. An example would be a salt/oil heat exchanger replacement for the traditional burn box for the high temperature cracking. Other types of advanced nuclear reactors, such as a molten salt reactor, for example, can be used to produce the required higher temperature industrial process heat directly.

Thermal storage opportunities also exist to separate the heat production and heat uses for nuclear thermal plants. The general proposal is to use the nuclear thermal plants primary coolant to heat a large thermal store, like phase-change salts for example, and pump them into large tanks. These large tanks of heated salts can then be used at a later time to either produce electricity, such as by a steam Rankine cycle, or be used to supply application-based process heat. By separating the production of heat and the direct use of it, the thermal store represents a flexible means to 'load follow' electrical production by operating at full power and filling up hot salt tanks but producing electricity at a more valuable time during peak demand or more traditional baseload energy production. This approach also allows the nuclear power plant to operate like a peaker plant for price arbitrage opportunities while still conducting full power operations. Additional cost savings also exist if the nuclear power plant and primary coolant/salt heat exchangers and salt storage facilities can be separated as not important to reactor safety so construction and equipment regulations for electricity production are similar to non-nuclear power plants. This allows for typical commercial security protocols, operation and maintenance costs ("O&M"), and quality standards that may justify any heat exchangers or heat losses by pumping hot salts away from the secure area of the nuclear power plant. In essence, the power system for the nuclear power plant could be built in a non-NQA1 environment (with the associated maintenance operations) to get commercially competitive builds from existing solar-thermal salt power companies.

Higher temperature reactors, such as sodium cooled, molten salt, high temperature gas reactors, and others, can also participate in hydrogen production using different processes than wind and photo-voltaic solar in addition to the steam-electrolysis discussed previously. One example of a higher temperature processes is a Copper-Chlorine cycle. In this cycle, process heat between 400 and 500 degrees C. is used to produce Hydrogen and Oxygen gas. The final step in the cycle uses ambient-temperature electrolysis to recycle all of the chemicals except the water that is converted into gas. This process represents an interesting opportunity to 'supply follow' cheap electricity produced during peak wind and solar. By operating a higher temperature nuclear thermal plant non-stop to produce hydrogen and oxygen gas, the plant equipment and O&M costs are justified while filling up tanks with Copper-Chlorine reactants for electrolysis. When electricity becomes cheap, the ambient temperature electrolysis is used to convert the tanks back into the appropriate chemical precursors to start the cycle over again. This process is similar in spirit to filling salt tanks with hot salt to be used at a later time, but more specifically tailored to an end chemical product. This example is used not necessarily to advocate a copper-chlorine cycle, but the general idea that electricity supply following is a different approach than energy storage to follow demand. This process also allows the bulk of the nuclear plant equipment used in hydrogen production to be in use with only some tanks and electrolysis equipment being idle during normal operations.

These features and benefits, along with many others, can be realized by rearranging a nuclear power plant, which allows for colocation of a nuclear thermal plant with industrial and chemical heat applications, reducing the footprint of the NQA1 qualification area, and load following capabilities while operating a nuclear reactor at full power.

With reference to FIG. 1, a typical nuclear power 100 plant is shown. The layout of the nuclear power plant 100 comprises two major parts: the nuclear island and the turbine island. The nuclear island has, at its core, the nuclear reactor area 102 that houses the nuclear reactor. A fuel handling area 104 is adjacent the reactor area, and both buildings are typically within a containment area 106. The containment area 106 may include a containment enclosure structure which may be a reinforced steel, concrete, or lead, or a combination of materials that creates a structure enclosing the nuclear reactor. Its design and function is to contain escaping radioactive steam or gas, and in many cases, is designed to contain escaping gas at a pressure of up to 550 kPa or more. The containment structure is designed as a last line of defense to withstand design basis accidents. The cost to build the containment structure is directly proportional to not only the size of the reactor, but also is based upon the balance of plant systems and components that need to be housed therein. The nuclear island also includes auxiliary components such as pumps, fluid loops, a control room, and other supporting components.

The fuel handling area 104, which may be within the containment area 106, is designed to provide refueling capability at a rate to sustain continuous reactor operation. It also houses sub-critical fuel outside the reactor core and prevents fuel damage and contamination. It may also contain equipment for moving fuel pins and fuel assemblies such as for reloading fuel into the reactor core.

Coupled to the reactor area and a part of the nuclear island are steam generators 108. In some cases, the steam generators 108 are within the containment area 106, and supply superheated steam to steam turbines 110. The steam generators 108 receive the thermal output from the reactor and transfer the thermal energy to steam turbines 110 which convert the steam energy into mechanical energy. In some installations, radioactive water is passed through the steam turbines 110, which must be kept within the radiologically controlled area of the nuclear power plant. The steam turbines 110, in turn, are mechanically coupled to generators 112 that convert the mechanical energy from the steam turbines 110 into electricity.

A fuel pin examination area 114 may be on-site to conduct post irradiation examination ("PIE") and analysis. The fuel pin examination area 114 is often adjacent to the fuel handling area 104 to share common fuel handling equipment. The fuel pin examination area 114 may additionally comprise a hot cell for storing and examining the irradiated fuel pins.

As shown in FIG. 1, the containment 106 area may be required to encompass the reactor area 102 as well as the fuel handling area 104. In some instances, the steam generator 108 buildings and associated equipment is outside the containment area 106, but in many cases is required to be within the containment area 106. One or more coolant loops are used to transfer the heat from the reactor area 102, through a heat exchanger, to a cooling fluid that not only cools the core of the nuclear reactor, but also allows the heat to be transported outside the containment area to the steam generator 108 buildings. In many instances, a primary coolant loop receives heat from the reactor core by a primary heat exchanger and transfers the thermal energy to a secondary coolant loop by a secondary heat exchanger. In many cases, the coolant in the primary coolant loop becomes radioactive. Many reactors currently in use rely on water under high pressure as a coolant and as a neutron moderator. The primary coolant typically undergoes a phase change from liquid to steam as it absorbs thermal energy from the reactor core and then transfers the thermal energy to the secondary loop.

The coolant in the secondary loop, which may also be water, receives heat from the primary coolant loop and undergoes a phase change from liquid to steam which is used to drive the steam generators. This superheated steam is typically under high pressure which requires safety measures to be in place to contain the high pressure and high temperature steam in the event of a breach.

In some instances, the primary and/or secondary coolant may be another material, such as molten metal. For example, in some fast reactors, molten metal, such as liquid sodium, is used as a coolant. In other instances, molten salt may be used as a coolant. Both molten metals and salts have a low vapor pressure, even at high temperatures, and are thus able to transfer heat at lower pressures than water is capable of at similar temperatures.

The nuclear power plant 100 is typically secured by a site boundary 120, which may include a security perimeter such as a tall fence with razor wire. The nuclear power plant 100 and its concomitant buildings, structures, systems, piping, etc. may be referred to as a nuclear site which is within the nuclear site boundary 120. Additional security measures are typically employed to secure the nuclear site, such as gates across all access points, guards at the access points, surveillance cameras, motion detectors, and/or electrified fencing, among other measures.

A nuclear power plant 100 is further required to have an emergency planning zone ("EPZ"), which is required in order to prepare for significant accidents at the nuclear power plant. In many cases, the EPZ encompasses a ten-mile radius from the nuclear power plant 100.

Figure 2:
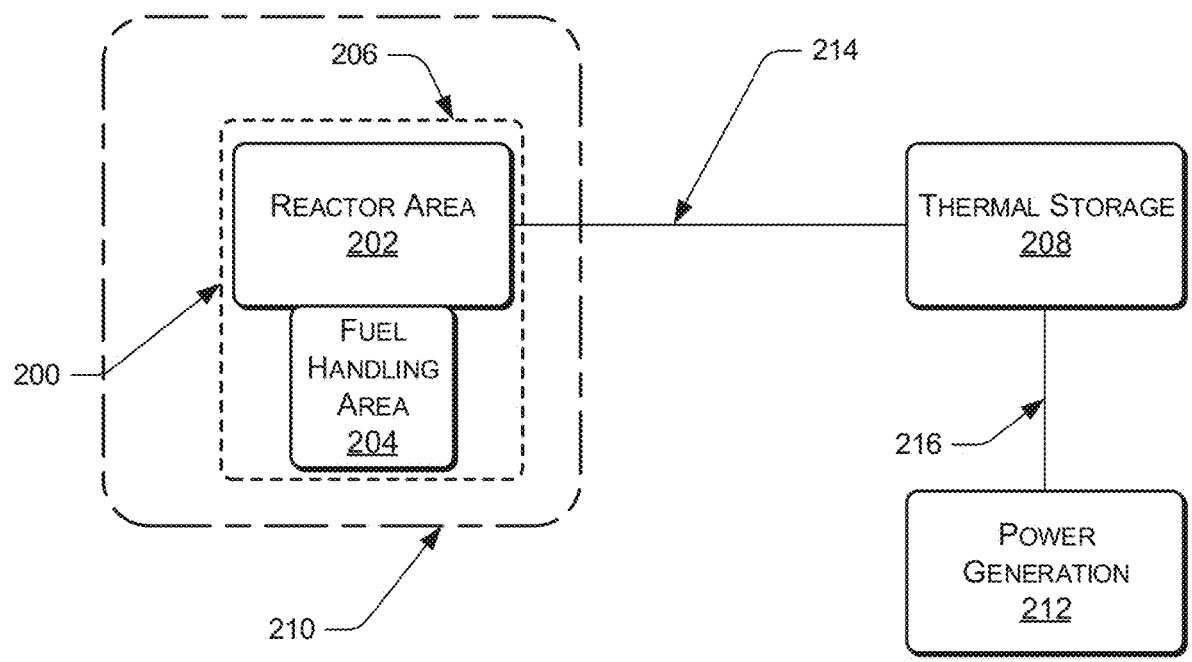
FIG. 2 shows a nuclear thermal plant decoupled from the power generation plant, in accordance with some embodiments.

As illustrated in FIG. 2, a reactor area 202 and a fuel handling area 204 are located within a containment area 206 having a containment structure. These two primary buildings, along with a control room, make up the nuclear island. In comparison with the typical nuclear power plant shown in FIG. 1, it can be seen that the steam generators, steam turbines, generators, and fuel pin examination area are no longer on the nuclear island. Rather, these components have been installed remotely from the nuclear island. The illustrated reactor area 202 is configured as a nuclear thermal plant 200 and is designed and operated to generate heat (as opposed to electricity as in the typical nuclear power plant). In the illustrated configuration, a thermal storage system 208 is remote to the nuclear island and receives the thermal energy from the nuclear thermal plant 200. It should be noted that the thermal energy generated by the nuclear thermal plant 200 is transported off the nuclear island, and in many cases, beyond the site boundary 210, and even beyond the EPZ.

One immediate advantage of this configuration is that the thermal storage 208 and power generation 212 facilities are outside of the nuclear regulatory domain. This allows a nuclear thermal plant 200 to be constructed and licensed far more efficiently than is possible with a nuclear power plant installation.

The nuclear reactor arrangement as in FIG. 2 can be any suitable type of nuclear reactor. For example, the nuclear reactor may include, but is not limited to, a thermal spectrum nuclear reactor, a fast spectrum nuclear reactor, a multi-spectrum nuclear reactor, a breeder nuclear reactor, or a traveling wave reactor. The thermal energy produced by the nuclear reactor may be transferred to a thermal storage system using an energy transfer system 214.

In some embodiments, a nuclear reactor may utilize a fuel that does not require heavy equipment to handle the fuel such as for reloading the fuel pins or refueling the reactor. Consequently, in these embodiments, the fuel handling area 204 may be much smaller than what is required for moving fuel pins and fuel assemblies into and out of the reactor core. Such a reactor may comprise a pool-type reactor, or a molten salt reactor, among others. One advantage of this type of reactor is that the fuel handling area 204 may be much smaller and therefore, the nuclear island and/or the containment area 206 may be smaller than what is typically required by reactors that utilize fuel pins and fuel assemblies and therefore require heavy equipment for their handling and maneuvering.

The nuclear reactor, in some embodiments, may include a nuclear reactor having a liquid coolant. For example, the liquid coolant of the nuclear reactor may include, but is not limited to, a liquid metal or salt coolant (e.g., uranium chloride, uranium trichloride, uranium tetrachloride, lithium fluoride, beryllium fluoride, or other chloride or fluoride salts, a liquid metal coolant (e.g., sodium, NaK, other sodium alloys, lead, or lead bismuth), a liquid organic coolant (e.g., diphenyl with diphenyl oxide), or a liquid water coolant.

In another embodiment, the nuclear reactor may include a nuclear reactor having a pressurized gas coolant. For example, the pressurized gas coolant may include, but is not limited to, pressurized helium gas or pressurized carbon dioxide gas.

In another embodiment, the nuclear reactor may include a nuclear reactor having a mixed phase coolant. For example, the mixed-phase coolant may include, but is not limited to, a gas-liquid mixed phase material (e.g., steam water-liquid water).

The thermal storage system 208 may include any suitable thermal storage plant, whether currently known or later developed. In some embodiments, the thermal storage system is capable of storing thermal energy within the range of 500° C. or higher. In some instances, the thermal storage system stores energy at 550° C., 600° C., 700° C., 750° C. or higher. In some instances, the thermal storage system 208 is designed to store thermal energy upwards of 1000° C. In some embodiments, the thermal storage system 208 has multiple thermal reservoirs and stores thermal energy at different temperatures.

The thermal storage system 208 is in thermal communication with the nuclear reactor by an energy transfer system 214. The energy transfer system 214 receives thermal energy from a primary heat exchanger associated with the nuclear reactor. For example, the nuclear reactor primary coolant passes through the primary heat exchanger and transfers thermal energy from the reactor core to the energy transfer system 214, thus cooling the primary coolant and transferring thermal energy to the energy transfer system 214. The energy transfer system 214 may be considered a secondary coolant loop designed to receive thermal energy from the primary coolant loop and transport the thermal energy to the thermal storage system 208.

For example, a first portion of the energy transfer system 214 may be in thermal communication with a portion of the primary coolant loop of the nuclear reactor and a second portion of the energy transfer system 214 may be in thermal communication with the thermal storage system 208.

It will be recognized by those skilled in the art that a combination of heat exchange loops, heat exchangers, and heat pipes may be used in conjunction to supply heat from the nuclear reactor, to the energy transfer system 214, and to the thermal storage system 208. For example, a primary heat exchanger containing a number of heat pipes may be used to thermally couple a primary heat exchange loop of the nuclear reactor with the energy transfer system 214. A second heat exchanger, which may also contain multiple heat pipes, may be used to thermally couple the energy transfer system 214 to the thermal storage system 208. In this way, thermal energy generated by the nuclear reactor can be transferred to the thermal storage system 208. The energy transfer system 214 may utilize liquid metal, salt, or some other working fluid to facilitate heat transport. Alternatively, the energy transfer 214 system may be in direct thermal communication with the storage media of the thermal storage system 208, such as where the storage media may travel from the thermal storage system 208 and go into the primary heat exchanger in the reactor vessel.

A power generation system 212 can be downstream from the thermal storage system 208 and in thermal communication with the thermal storage system 208. The result of this type of configuration is that the nuclear island is decoupled from the power generation system 212. In other words, a fault occurring in equipment associated with the power generation system 212 or the thermal storage system 208 does not immediately impact the nuclear reactor. In traditional nuclear reactor systems, a fault in equipment associated with the power generation system 212 will oftentimes cause an automatic and immediate shutdown of the reactor core. This is generally provided as a safety feature to circumvent an issue with excess generated heat without sufficient heat transfer capacity to remove the excess heat from the nuclear reactor system.

In some instances, the thermal storage system 208 has a greater thermal energy capacity than the thermal power output of the reactor is designed to output. For instance, the thermal storage system 208 may be designed to deliver 1200 MWth of energy, while the nuclear reactor is designed and operated to output 400 MWth of energy. This allows the thermal storage system 208 to store excess energy beyond what the nuclear reactor delivers and to deliver this energy to a power generation plant 212 as needed. For example, where the load demand on the thermal storage system 208 is lower than the output of the reactor, the thermal storage system 208 is charged with additional thermal energy. During high-demand time where the load demand on the thermal storage system 208 is greater than the output of the reactor, then the thermal storage system 208 is drained.

As further illustrated in FIG. 2, a power generation plant 212 is coupled to the thermal storage system 208. The power generation system 212 can be any now-known or later developed power generation system 212. In some embodiments, the power generation system 212 receives thermal energy from the thermal storage system 208 and converts the thermal energy to electricity.

In some instances, the thermal energy is passed through a steam generator to create high temperature and high-pressure steam, which can be used to drive a steam turbine. The steam turbine, in turn, drives a generator and converts the mechanical work of the steam turbine to electricity, which can be delivered to the electrical grid, as is well-known.

In other instances, the thermal energy from the thermal storage system 208 can be delivered to solid state electricity generating devices that convert heat directly to electricity without the need to generate steam or convert thermal energy into mechanical work. Such systems are in development now, and the disclosed embodiments are well-suited to be coupled to a future developed power generation plan that requires heat in order to generate electricity.

The thermal storage system 208 is in thermal communication with the power generation system 212 through any suitable means. For instance, an energy delivery system 216 may be provided to deliver thermal energy from the thermal storage system 208 to the power generation system 212. For example, the energy delivery system 216 may include a fluid loop having a first portion in thermal communication with the thermal storage system 208, such as by a heat exchanger, and a second portion in thermal communication with the power generation system 212, such as by another heat exchanger. The heat exchangers may be any suitable heat exchangers, such as, but not limited to, shell and tube heat exchangers, double pipe heat exchangers, plate heat exchangers, condensers, evaporators, boilers, or a combination of one or more different types of heat exchangers, to name a few.

The illustrated configuration and the application of a thermal storage system 208 allows the nuclear reactor to be decoupled from the power conversion applications. This provides numerous benefits. For example, the nuclear reactor is no longer subject to transients from outside the site boundary 210 that may cause balance of plant trips. These types of malfunctions can be handled without having to shut down the nuclear reactor. In traditional nuclear power plants, a plant transient leads to a reactor trip, which is an economic and safety concern. These transients may be caused by failures in the balance of plant systems, such as a malfunctioning component with the steam generator, steam turbine, or some other auxiliary component, which causes the nuclear reactor to be shut down. These issues are no longer a concern with a nuclear thermal plant 200, since the nuclear reactor is decoupled from the balance of plant systems. Either the power generation system 212, the thermal storage system 208, or the nuclear reactor system can be safely shut down, such as for maintenance, without impacting the other systems.

For example, the nuclear reactor system can be shut down and taken offline while the thermal storage system 208 can continue to provide thermal energy to the power generation system 212 which continues to deliver power. Likewise, the power generation system 212 can be shut down, or operated with a reduced output, while the nuclear reactor system continues to generate thermal energy and essentially charges the thermal storage system 208. In some embodiments, the nuclear reactor system is operated at full capacity and the thermal energy is transferred to the thermal storage system 208, which is completely independent of the load on the power generation system 212. The load on the power generation system 212 will have a tendency to vary throughout the day, week, month, and season, while the nuclear reactor system is able to continually operate at full capacity regardless of the load.

Furthermore, in nuclear thermal plants that utilize a sodium-cooled reactor, moving the steam generation system, as described, to a remote location increases safety since there is very little to no risk that water from the steam cycle will interact with the sodium used in the nuclear reactor.

In a traditional nuclear power plant, an intermediate coolant loop transfers thermal energy from the primary coolant loop of the reactor to the steam generator experiences radiation exposure as it is in close proximity to the nuclear reactor core and must be designed to withstand this type of radiation which degrades the construction materials. For instance, certain metals may become brittle through radiation hardening, which reduces toughness and leads to possible brittle fractures. In the described arrangement, the intermediate coolant loop is moved away from the nuclear reactor (or eliminated altogether) and can be made of materials that are easier to source and manufacture and are therefore less expensive and more readily available.

As illustrated, the thermal storage system 208 and the power generation system 212 are outside the site boundary 210 of the nuclear thermal plant 200. Specifically, the nuclear thermal plant 200 is within a site boundary 210, such as a protected fence, and all the equipment within the site boundary is subject to strict nuclear regulation. Where the balance of plant system, such as the thermal storage system 208 and power generation system 212, are located remotely and outside the site boundary 210, there is significantly less regulation of these systems which makes construction, licensing, and operation much more efficient. These balance of plant systems may additionally be positioned outside the EPZ.

In some embodiments, the nuclear thermal plant 200 may comprise a nuclear reactor that is inherently safe and the EPZ may be sized to coincide with the site boundary 210. In other instances, the EPZ may be sized to be within the site boundary 210. In either case, locating the balance of plant systems outside of the nuclear site boundary 210 has numerous advantages in terms of safety, efficiency, and speed of construction and licensing.

Furthermore, in the described arrangement, a nuclear thermal plant 200 is capable of load following. Load following is the concept of adjusting the power output as demand for electricity fluctuates throughout the day. A traditional nuclear power plant typically operates at full power all the time and does not generally fluctuate its output power. In the described arrangement, the nuclear thermal plant 200 can operate at full power, which may be designed to meet the base load requirements of the electrical grid. The base load on an electrical grid is the minimum level of demand over a span of time. This demand can be met by continuous power plants, dispatchable generation (e.g., on-demand power systems), by a collection of smaller intermittent energy sources, or by a combination of energy sources. The remainder of demand, varying throughout a day, can be met by dispatchable generation which can be turned up or down quickly, such as load following power plants, peaking power plants, or energy storage.

The thermal energy output from the nuclear thermal plant 200 is stored at the thermal storage system 208 and is delivered to the power generation system 212 on an as-needed basis. In other words, the nuclear thermal plant 200 can charge the thermal storage at a near-constant rate, and the thermal storage system 208 can provide thermal energy to the power generation system 212 to generate electricity that follows the electrical load demand from the electrical grid. Thus, a nuclear thermal plant 200 can meet not only base load requirements, but also provide load following capabilities while operating continuously at full power or near full power.

Furthermore, because the thermal storage system may be sized larger than what the nuclear thermal plant 200 is configured to deliver, the nuclear thermal plant 200 can "charge" the thermal storage system during times of non-peak electrical demand. In many load following power plants, the plant is operated during the day and early evening and is operated in direct response to changing demand for power supply. The power plant may shut down in early evening or overnight when demand is low, and then start up again as demand increases during the day. In the described arrangements, the nuclear thermal plant 200 can run continuously, and the produced thermal energy can be stored until it is needed for electricity generation, or some other purpose. In some instances, the nuclear thermal plant 200 may produce less thermal energy than is required to meet the peak load demand, but because it can charge the thermal storage during non-peak usage times, the overall energy output from the nuclear thermal plant 200 can supply the base load and peak load demand over time.

In other instances, the nuclear thermal plant 200 can produce more energy than is required to meet the base load demand. For instance, the nuclear thermal plant 200 can produce sufficient thermal energy to be used to meet the base load demand, plus excess thermal energy to meet the peak load demands as well as provide additional thermal energy for other industrial purposes.

Figure 3:
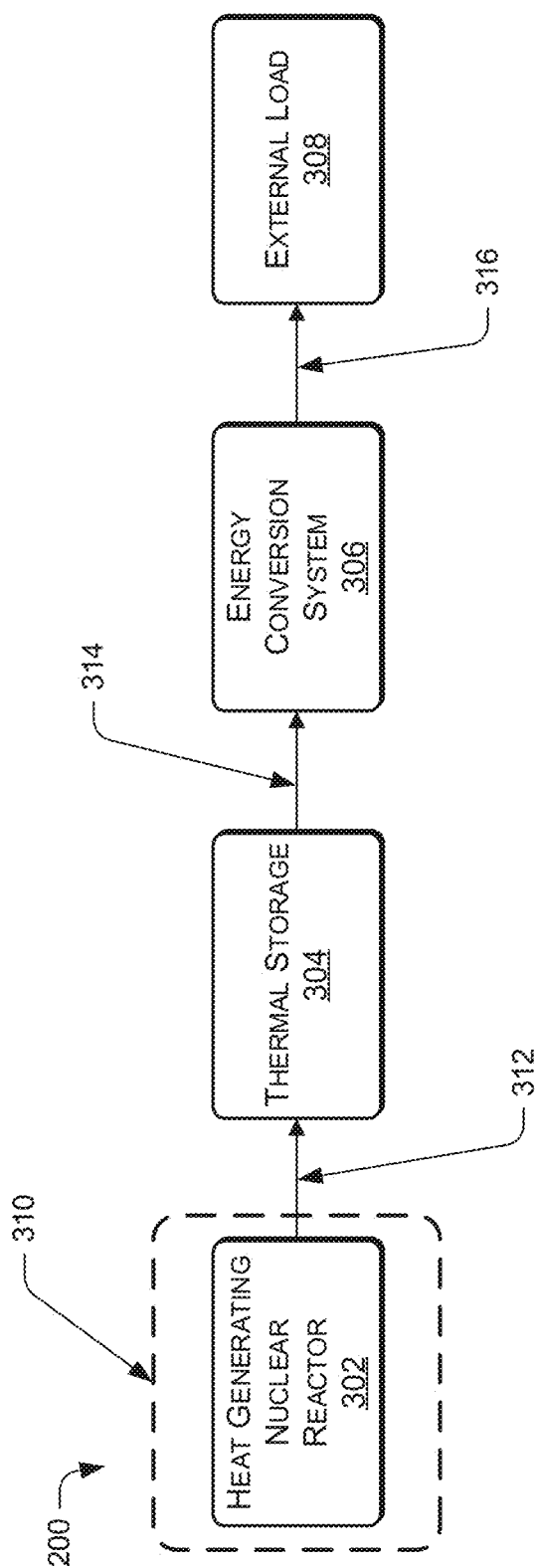
FIG. 3 shows a nuclear thermal plant coupled to a thermal storage plant, in accordance with some embodiments.

With reference to FIG. 3, a nuclear thermal plant 200 is illustrated that comprises a heat generating nuclear reactor 302. The nuclear reactor 302 is in thermal communication with a thermal storage system 304. The thermal storage system 304 is in thermal communication with an energy conversion system 306, which is in communication with an external load 308.

The heat generating nuclear reactor 302 may be any suitable type of nuclear reactor now known or later developed, such as fission reactors or fusion reactors. Such suitable reactors include, but are not limited to, fast neutron nuclear reactors, thermal neutron nuclear reactors, heavy-water nuclear reactors, light-water-moderated nuclear reactors, molten salt reactors, liquid metal cooled reactors, organically moderated nuclear reactors, water cooled reactors, gas cooled nuclear reactors, and breed and burn reactors, to name a few. Furthermore, the heat generating nuclear reactor 302 may comprise any suitable size of nuclear reactor, such as a small modular reactor, a micro reactor, and even up to a gigawatt size reactor, or larger. Moreover, one or more reactors, which may be the same type of reactor, or different types and sizes of reactor, may be utilized in an integrated energy conversion system.

The nuclear site boundary 310 is a physical barrier surrounding the nuclear thermal plant 200 and is designed to safeguard the nuclear reactor 302. In many cases, the site boundary 310 surrounds the nuclear island, which as previously described in conjunction with described embodiments, can be much smaller than in typical nuclear power plants.

The thermal storage system 304 is located outside the nuclear site boundary 310. As described, the thermal storage system 304 may be any suitable type of thermal storage system 304 and can utilize any suitable type of thermal storage media. For example, the thermal storage media may comprise eutectic solutions, phase-change materials, miscibility gap alloys, mixtures of metals (e.g., $AlSi_{12}$), cement-based materials, molten salt (e.g., chloride salts, sodium nitrate, potassium nitrate, calcium nitrate, NaKMg, or NaKMg—Cl, among others), solid or molten silicon, or combinations of these or other materials.

In some examples, the thermal storage media is also used as the heat transfer fluid within an energy transfer system 312 and/or the energy delivery system 314. In this way, the energy transfer system 312 may be in fluid communication with the energy conversion system 306 and the heat delivery fluid of the energy transfer system 312 may directly interact with the thermal storage medium of the thermal storage system 304. Similarly, in some examples, the energy delivery system 314 may use a heat transfer fluid that is the same as the thermal storage medium of the thermal storage system 304. In some cases, the thermal storage system 304 may be in direct fluid contact with the energy delivery system 314.

The thermal storage system 304 is in thermal communication with the nuclear reactor 302 by an energy transfer system 312 that may be thermally coupled to the nuclear reactor 302 and to the thermal storage system 304 by heat exchangers. The energy transfer system 312 transfers thermal energy, typically through insulated conduits, to the thermal storage system 304, where the thermal energy is stored until it is needed.

The thermal storage system 304 is in thermal communication with an energy conversion system 306, such as by an energy delivery system 314. The energy conversions system 306 may be any suitable type of now-known or later developed technology that is capable of converting thermal energy into another form of useful energy. In some examples, the energy conversion system 306 utilizes a steam turbine, which may operate on the Rankine cycle, to convert steam to mechanical work. In many instances, steam is sent through a steam turbine that rotates the shaft of a generator to create electricity.

The energy delivery system 314 may be any suitable combination of thermally transmissive equipment. In some cases, one or more heat exchangers are associated with each of the thermal storage system 304 and the energy conversion system 306. A working fluid disposed in the energy delivery system 314 (such as in a fluid loop), receives thermal energy from the thermal storage system 304 at one or more heat exchangers associated with the thermal storage system 304, and delivers the thermal energy to the energy conversion system 306 at one or more heat exchangers associated with the energy conversion system. The energy delivery system 314 can use any suitable working fluid, as has been described herein.

The energy conversion system 306 can be coupled to an external load 308 by an energy transmission system 316. The external load may be a utility electrical grid. The energy conversion system 306 can deliver the generated electricity to the electrical grid, such as by high voltage transmission lines that carry the power from the energy conversion system to demand centers. Notably, the energy conversion system 306 is remote from the nuclear reactor 302, and in many cases is outside the nuclear site boundary 310, and in many cases, is also outside the EPZ. As described, the nuclear reactor 302 is decoupled from the energy conversion system 306 and any faults at the energy conversion system 306 do not negatively impact the nuclear reactor 302, and vice versa. In fact, even when the nuclear reactor 302 is shut down, such as for maintenance or refueling, the thermal storage system 304 is able to continue to deliver thermal energy to the energy conversion system 306 for supplying electricity to the external load.

The relatively low cost of the thermal storage system 304 relative to the nuclear thermal plant 200 favors scaling up the thermal storage system 304 and scaling down the nuclear thermal plant 200. Furthermore, in instances that utilize low-pressure heat transport (e.g., molten salt as a heat transport medium), the relatively high-cost energy conversion equipment 306 is installed remotely to the nuclear thermal plant 200, where it can be constructed more efficiently and without the required regulation if it were constructed at the nuclear site. As used in this disclosure, the term "low-pressure" is used to indicate pressures below about 3.5 MPa.

Additionally, in those instances where there are no high-pressure systems (e.g., greater than about 3.5 MPa) coupled to the nuclear reactor 302, the EPZ can be minimized and heat transport distances can be reduced. In some instances, the thermal storage system 304 may be installed adjacent to the nuclear site, but outside the site boundary 310. This minimizes the heat transport distance while keeping the thermal storage system 304 and energy conversion system 306 outside the nuclear site boundary 310 and outside the purview of nuclear regulations.

Figure 4:
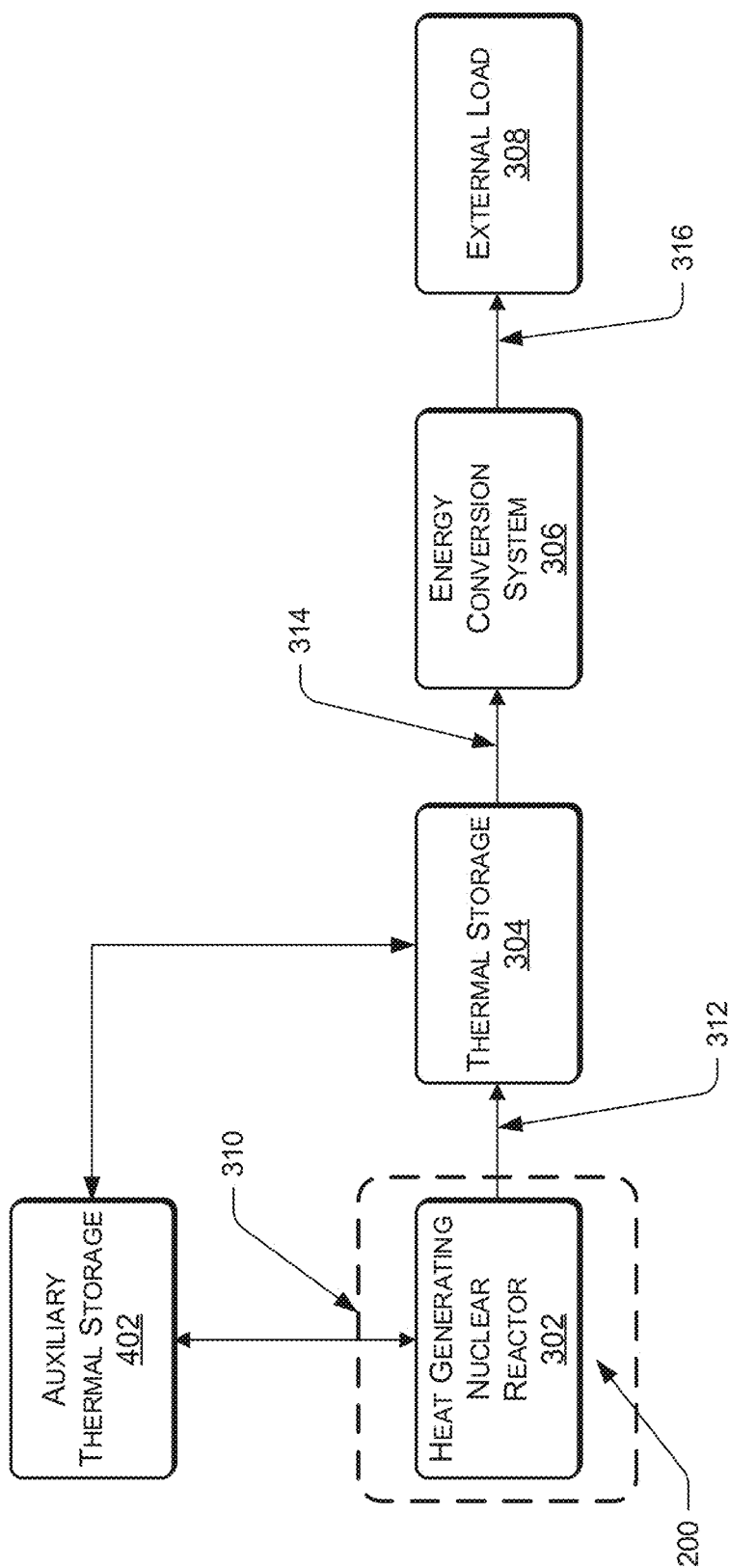
FIG. 4 shows a nuclear thermal plant coupled to a remote thermal storage plant with an optional auxiliary thermal storage, in accordance with some embodiments.

With reference to FIG. 4, a nuclear reactor 302 may be similar to the described reactor of FIG. 3, and is coupled to a thermal storage system 304, which may be substantially similar to the thermal storage system 304 as in FIG. 3. The nuclear reactor 302 may also be coupled to an auxiliary thermal storage system 402. In some instances, the thermal storage system 304 may optionally be thermally coupled to the auxiliary thermal storage system 402. The nuclear reactor 302 can be configured to transport thermal energy to the thermal storage system 304, the auxiliary thermal storage system 402, or both.

The thermal storage system 304 is coupled to an energy conversion system 306 as has been described herein. The energy conversion system 306 is coupled to an external load 308, which may be any load such as an electrical load or a thermal load.

The auxiliary thermal storage 402 may be installed outside the nuclear site boundary 310, as illustrated, or in some cases, may be installed within the nuclear site boundary 310. In some embodiments, its function is to control the return and core inlet fluid temperature to the nuclear reactor 302. Where there is a difference between the actual Tin and the expected Tin, a reactor control system may initiate a change to the reactivity to account for the temperature difference. For example, where the core inlet temperature is higher than expected, the reactor control system may reduce reactivity to account for the higher than expected inlet temperature.

The auxiliary thermal storage 402 may be dedicated to the reactor and used to control and/or stabilize the core inlet temperature. For example, the auxiliary thermal storage 402 may be in thermal communication with the primary coolant loop within the reactor vessel. As the primary coolant fluid has a temperature that differs from the expected Tin, the auxiliary thermal storage 402 can interact with the primary coolant loop to either add or remove heat from the primary coolant. As the primary coolant interacts with the working fluid of the auxiliary thermal storage, the effect is that the primary coolant reaches thermal equilibrium with the auxiliary thermal storage fluid. By controlling the primary coolant temperature, the reactivity within the nuclear core is stabilized and any natural fluctuations are smoothed.

In some examples, the auxiliary thermal storage system 402 is in direct thermal communication with the nuclear reactor 302, such as by having a portion of the nuclear reactor thermal energy diverted to the auxiliary thermal storage 402. In other examples, the auxiliary thermal storage 402 is in thermal communication with the thermal storage system 304, and a portion of the thermal energy from the thermal storage system 304 is diverted to the auxiliary thermal storage 402 for use in regulating the nuclear reactor core inlet temperature.

One having skill in the art will readily understand how these various systems may be in thermal communication with one another and used to regulate the core inlet temperature.

Figure 5:
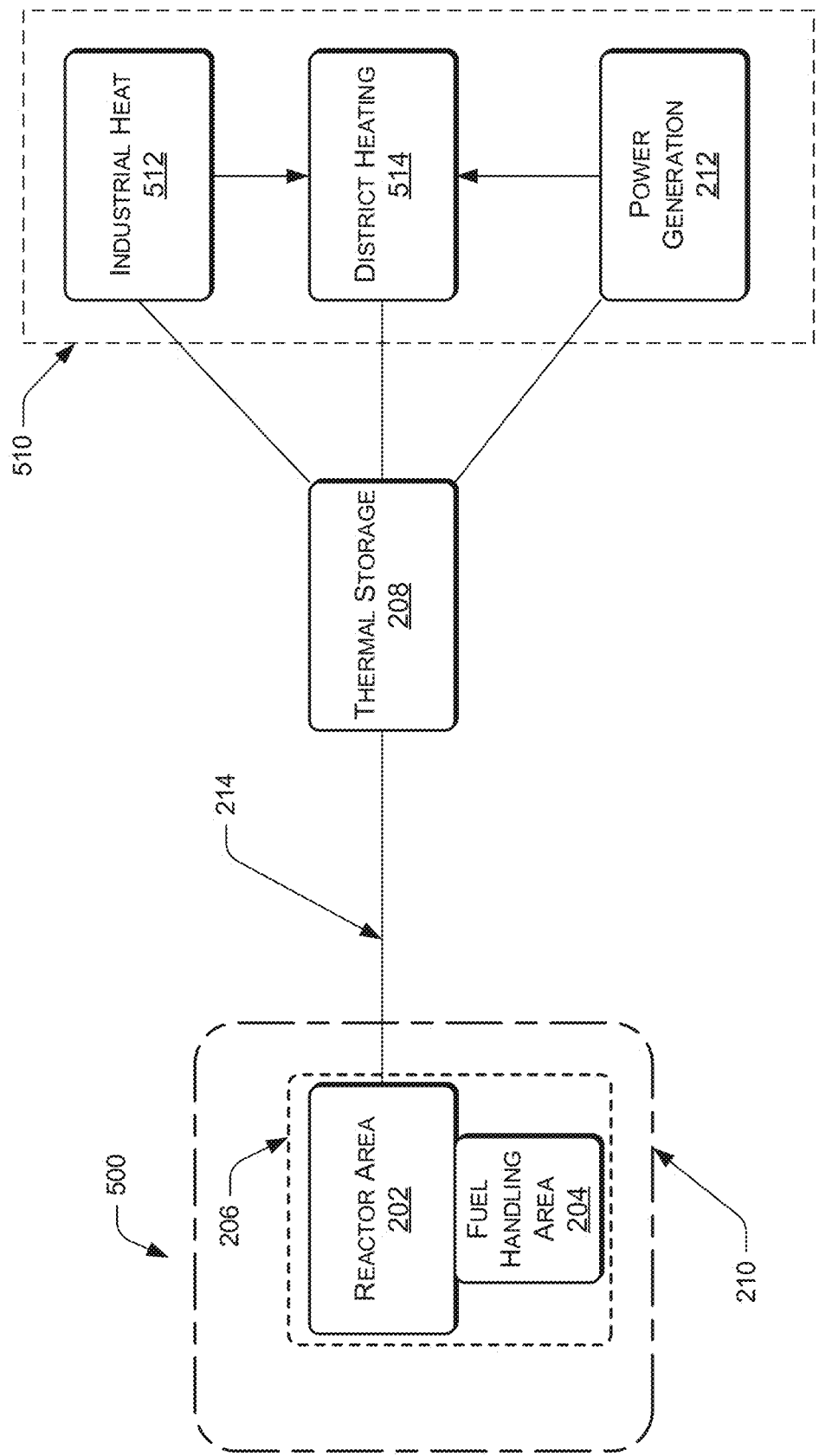
FIG. 5 shows a nuclear thermal plant coupled to a remote thermal storage system that is coupled to external loads, in accordance with some embodiments.

With reference to FIG. 5, a nuclear thermal plant 500 is illustrated, which may be as substantially described previously. Notably, in some reactor designs, there is no need to rely on heavy fuel assembly manipulation equipment. For example, in a pool type reactor, such as a molten salt reactor, there are no fuel pins or fuel assemblies that need to be stored, moved, inserted, or withdrawn from the reactor core. Consequently, the fuel handling area 204 may be significantly reduced in size from that of a traditional nuclear power plant. Moreover, many reactor designs that rely on proliferation resistant fuel cycles, such as a breed and burn reactor or molten salt reactors, do not need to include the fuel handling area 204 within the containment area. In these embodiments, the containment area 206 may be much smaller and only include the nuclear reactor and smaller subsystems of the reactor. This results in a significantly smaller containment area 206, which translates to a lower cost to construct, license, and operate.

In addition, a smaller containment area 206 results in a smaller footprint of the site boundary 210. Moreover, in those reactor designs that are inherently safe, the site boundary 210 may be minimized and the EPZ may also be minimized. In some cases, the EPZ boundary coincides with the nuclear site boundary 210, or in some cases, the EPZ is within the site boundary 210. This allows the thermal storage system 208 and/or the power generation system 212 to be located outside the site boundary 210 while being located relatively close to the site boundary 210 to reduce the thermal transmission distance of the energy transfer system 214.

As illustrated, the thermal storage 208 may be in thermal communication with one or more loads 510. For example, the thermal storage system 208 may deliver heat energy for industrial heating 512, district heating 514, or power generation 212, among others.

Industrial heat 512 applications are varied and require heat at various temperatures. Industrial heat applications may include fluid heating, such as for food preparation, chemical production, reforming, distillation, hydrotreating, and require temperatures in the range of from about 110° C. to about 460° C. Similarly, curing and forming processes such as for coatings, polymer production, enameling, extrusion, and the like require heat in the range of from about 140° C. to about 650° C. Other processes include things like iron forming, smelting and steelmaking, and plastics and rubber manufacturing. This industrial heat can be provided by the thermal storage system 208, as needed in the quality and quantity according to the specific industrial heat 512 requirements.

District heating 514 is a distribution system for heat from a central source through a system of insulated pipes such as for commercial and residential heating applications (e.g., space heating and water heating). This heat is generally in the lower temperature range and can be provided by the thermal storage system 208, as needed.

As already discussed, the thermal storage system 208 may be coupled to a power generation plant 212 and the thermal energy of the thermal storage system 208 can be used to generate electricity. The power generation system 212 can generate electricity on-demand and load follow the demand from the electrical grid. In many cases, the power generation system 212 will produce waste heat, that is, heat that is not used for electricity generation. This may be in the form of steam after it has passed through a steam turbine. This so-called waste heat may be recirculated, such as for providing district heating, which typically has a lower temperature requirement than power generation 212 or industrial heat 512 applications. Similarly, waste heat from industrial heat 512 applications can be captured and/or recirculated to provide heat for other uses, such as district heating, or returned to the thermal storage system 208.

In some embodiments, the thermal storage system 208 is capable of providing thermal energy for all the required loads simultaneously. This can be accomplished by scaling the thermal storage to a size capable of supplying the thermal power demand from all the expected loads. Because the loads are variable, for example, district heating 514 is in higher demand when ambient temperatures are colder, and power generation 212 such as for household use increases during the day and decreases at night, the thermal storage system 208 can be sized and configured to provide all the necessary load 510 requirements.

The thermal storage system 208 may include multiple storage facilities linked together. The multiple storage facilities may include the same, or different, thermal storage media, and may be maintained at different temperatures that are better suited for different thermal loads. For example, some industrial heat applications 512 require temperatures in excess of 800° C. In these cases, one or more individual storage facilities can store thermal energy in excess of 800° C. for delivery to these high temperature loads. Similarly, one or more individual storage facilities can supply relatively low temperature thermal energy, such as 100° C. to 300° C. to loads requiring lower temperatures. Of course, individual storage facilities may utilize different thermal storage media specifically designed to operate within the desired temperatures.

For example, a high-temperature storage facility may utilize molten salt as the thermal storage media, which may be formulated to be thermally stable up to 1000° C. or more. A lower temperature storage facility may utilize water as the thermal storage media for its high thermal capacity (approx. 4.2 J/(cm$^3$·K)).

Figure 6:
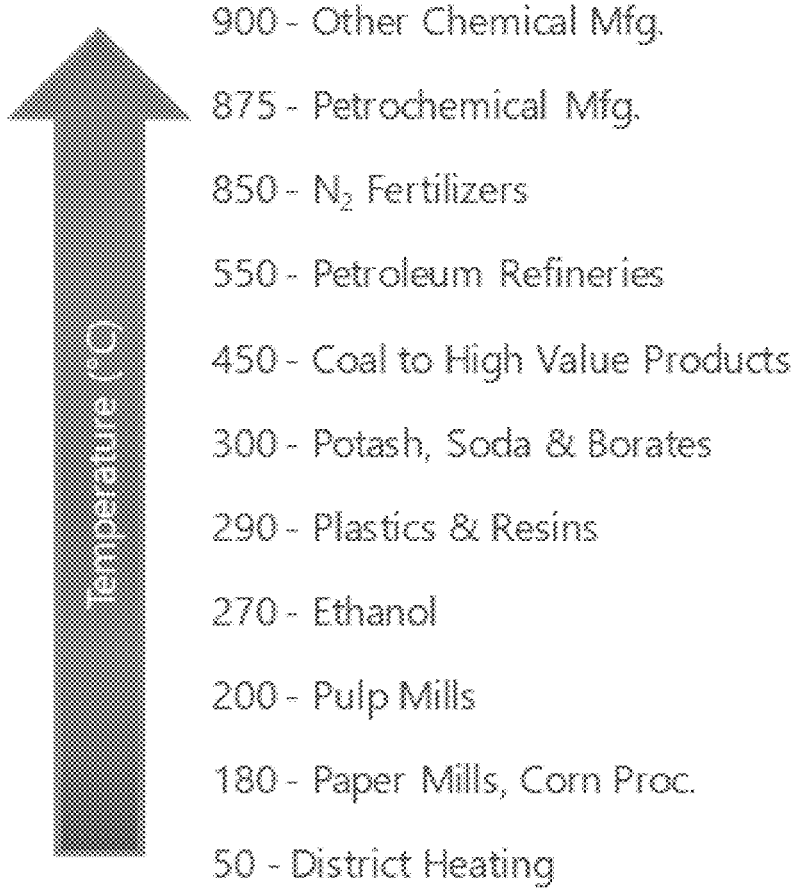
FIG. 6 shows illustrative industrial heating applications and required temperatures.

FIG. 6 illustrates various industrial heat applications for which the thermal storage system can provide the required thermal energy. As illustrated, district heating requires temperatures of about 50° C. This can be provided by a thermal storage system having a thermal storage media that is stable at around 50° C., and accounting for efficiencies in heat transfer, the storage media may be maintained at temperatures higher than the required temperature, and a heat exchanger may be in thermal communication with the district heating working fluid, which may be air, water, oil, or some other suitable working fluid, for a predetermined time sufficient to heat the working fluid to a desired temperature sufficient for district heating.

Most nuclear reactors in operation today operate at temperatures in the lower half of the figure, that is, less than about 300° C. These nuclear reactors would be capable of storing thermal energy at a temperature of up to about 300° C., which is suitable for many lower temperature thermal load applications, including power generation.

However, for the higher temperature thermal application (e.g., above 300° C.), traditional water-cooled nuclear power plants are not capable of producing temperatures in this range. However, there are nuclear reactors that are designed to operate at about 500° C.-550° C. that are suitable for providing thermal energy up to their operating temperatures. Other nuclear reactors are designed to be capable of operating at 750° C.-800° C. and could provide heat in this range suitable for the higher temperature industrial uses. Still other reactors are capable of operating at temperatures of 1000° C. or higher and are suitable for providing very high heat for industrial purposes. Fusion reactors, which are promised to operate in the hundreds of millions of degrees Celsius, could provide thermal energy even higher than fission reactors.

Figure 7:
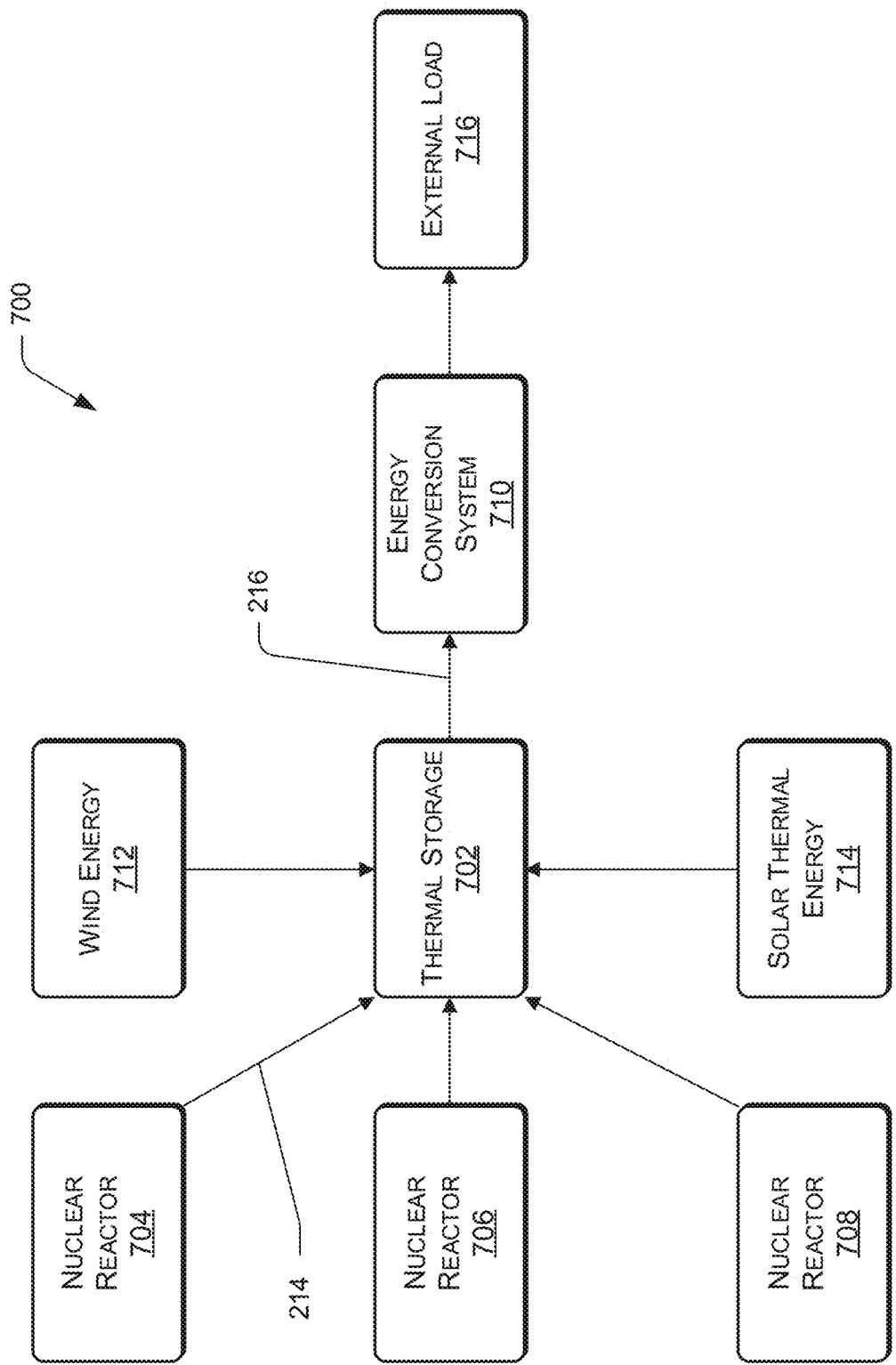
FIG. 7 shows an energy system in which multiple heat sources share a common thermal storage and energy conversion system, in accordance with some embodiments.

With reference to FIG. 7, an integrated energy system 700 is illustrated in which a thermal energy storage system 702 is fed thermal energy from a variety of heat sources. The thermal energy storage system 702 may be substantially as previously described herein. One or more nuclear reactors 704, 706, 708, can be in thermal communication with the thermal energy storage system 702. For example, when constructing an integrated energy system 700, as illustrated, a single, first reactor 704 may be constructed utilizing then-existing nuclear reactor technology. The thermal energy storage system 702 can be coupled to the energy conversion system 710, such as for converting the thermal energy to electricity and delivering the electricity to an external load.

In some instances, a second nuclear reactor 706, a third nuclear reactor 708, or more nuclear reactors can be coupled to a common thermal energy storage system 702. In some embodiments, one or more thermal energy sources, which may be any of a number of nuclear reactors, wind energy systems 712, solar energy systems 714, geothermal energy systems, or any combination of thermal energy sources, can be combined and coupled to a thermal energy storage system 702 as part of the integrated energy system 700. The thermal energy sources deliver thermal energy to the thermal energy storage system 702 through any suitable technology and components, which may be different for different ones of the thermal energy sources. In some cases, the thermal energy storage system 702 utilizes a working fluid for storing thermal energy, which may be the same working fluid as used for a thermal transfer fluid to deliver thermal energy from the thermal energy sources to the thermal energy storage system 702.

As the base load electrical demand increases over time, the thermal energy storage system 702 may be scaled up to increase the thermal energy storage capacity. Similarly, the nuclear reactors may also be scaled, upgraded to take advantage of different technology, or additional reactors added as heat sources and coupled to the common thermal energy storage system 702. As an example, a sodium fast reactor may be constructed and coupled to the thermal energy storage system 702. As the demand from the external load 716 increases, or as nuclear reactor technology progresses in its technology readiness level, another nuclear reactor may be constructed and coupled to the thermal energy storage system 702. For example, a molten salt reactor, a small modular reactor, a sodium pool reactor, or some other type of reactor, may be constructed and coupled to the thermal energy storage system 702 in addition to, or as an alternative to, an existing reactor coupled to the thermal energy storage system 702.

In many examples, multiple nuclear reactors can be built each having their own unique reactor vessel, head, and site boundary, and everything beyond the site boundary can be common to the multiple nuclear reactors. Of course, piping and valving could be used to couple the nuclear reactors to the thermal energy storage system 702. The energy delivery system could use common, or differing, thermal transfer media to couple the nuclear reactors to the thermal energy storage system 702. By utilizing common balance of plant components, such as a common thermal energy storage system 702, common steam plant, common heat transport, and common energy conversion system 710, there are efficiency gains in scaling the size of the thermal energy storage system 702 rather than building separate nuclear power plants for providing electricity, each with their own balance of plant requirements.

Providing multiple reactors coupled to a common thermal energy storage system 702 provides the additional benefit of ease of maintenance of the nuclear reactors. One nuclear reactor can be taken off-line, such as for maintenance or refueling, without shutting down the entire system. In some instances, the one or more thermal energy generating systems (e.g. nuclear reactors, wind energy systems 712, solar thermal energy systems 714, geothermal systems, and others) are decoupled from the thermal energy storage system 702 and the energy conversion system 710, so that one or more thermal energy systems can be taken offline without affecting the rest of the equipment or interrupting the supply of energy to the external load 716.

In some examples, the heat transfer fluid is molten salt throughout the entire energy system, except for perhaps the nuclear core, which may use any of a number of coolants. For example, the energy transfer system 214 that carries thermal energy from the nuclear thermal plant 704 to the thermal energy storage system 702 can utilize molten salt as its working fluid. Similarly, the thermal storage media within the thermal energy storage system 702 can likewise be a molten salt, which may be the same salt as the energy transfer system 214 working fluid. Furthermore, the energy delivery system 216 that transfers heat from the thermal energy storage system 702 to the energy conversion system 710 may likewise be molten salt. Of course, the molten salts used throughout the system may be the same salt or may have different formulations specific to their intended uses.

For example, where the thermal energy storage system 702 supplies heat to a district heating load, a relatively low-temperature is required and a salt (or other working fluid) specifically formulated to excel at the lower temperatures required may be used as a working fluid to deliver heat used for district heating.

In addition, other forms of thermal energy may be coupled to the thermal storage system, such as solar thermal energy 714 or wind energy 712. In many cases, the thermal energy storage system 702 is agnostic as to the source of thermal energy and may be coupled to a number of different types of thermal energy generators, such as any of a number of nuclear thermal plants, solar plants, wind farms, geothermal plants, hydroelectric plants, or other types of heat generating plant.

Figure 8:
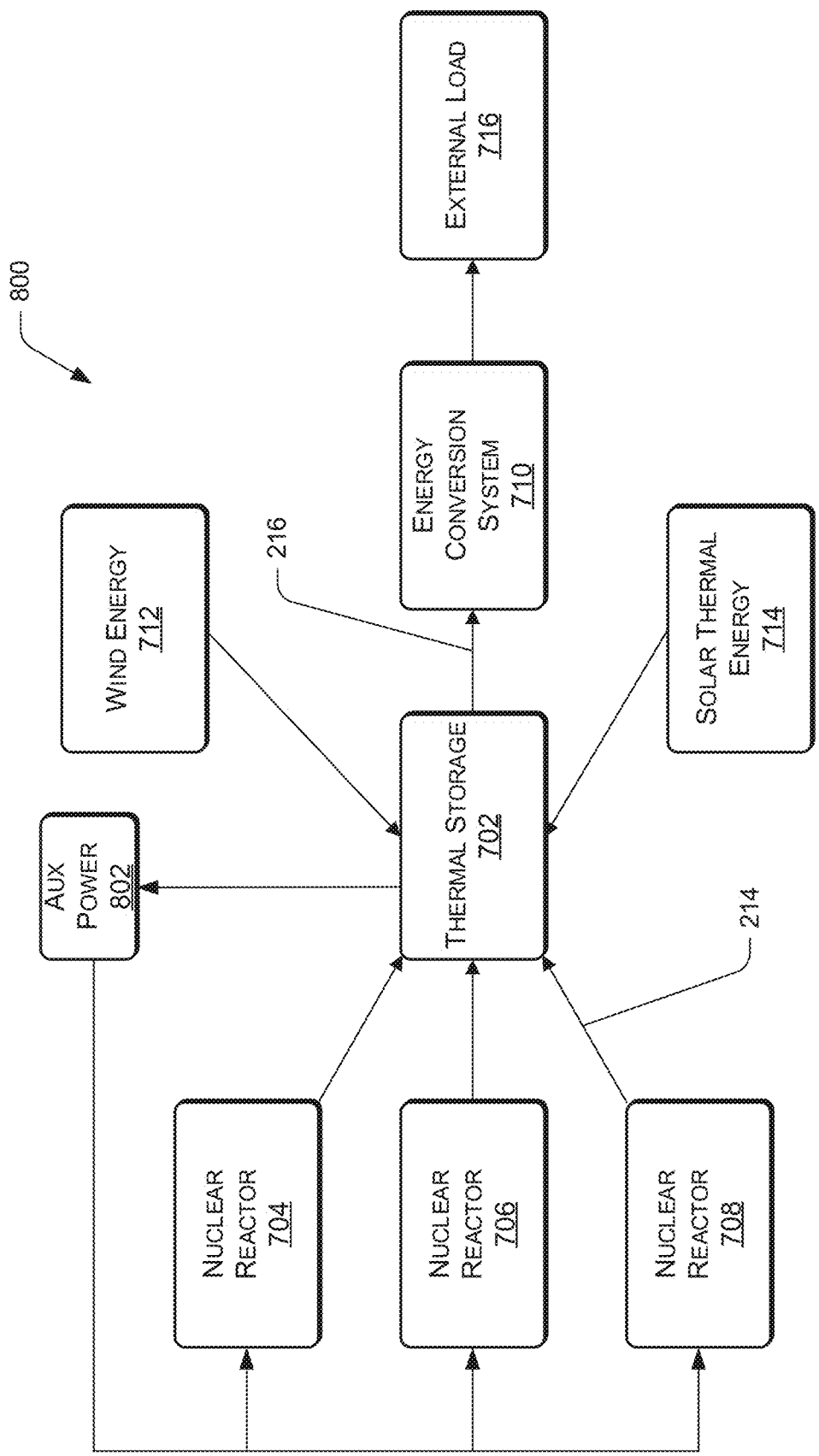
FIG. 8 shows an energy system in which multiple heat sources share a common thermal storage and energy conversion system, with an auxiliary power system according to some embodiments.

FIG. 8 illustrates an example energy system 800 in which a number of thermal energy sources are thermally coupled to a thermal energy storage system 702. The thermal energy sources may be any one or more of a number of thermal energy systems, such as nuclear reactor thermal plants 704, solar thermal plants 714, wind energy plants 712, or other type of thermal energy generating plant, or any combination of thermal energy generating plants.

The thermal energy plants supply thermal energy to the thermal energy storage system 702, which stores the thermal energy through any suitable means, such as eutectic solutions, phase-change materials, miscibility gap alloys, mixtures of metals, cement-based materials, molten salt (e.g., chloride salts, sodium nitrate, potassium nitrate, calcium nitrate, NaKMg, or NaKMg—Cl, among others), solid or molten silicon, or combinations of these or other materials. In some embodiments, the thermal energy storage system 702 utilizes a working fluid that is the same as the thermal energy transfer fluid that receives thermal energy from one or more of the thermal energy generating plants. In some instances, the thermal energy transfer fluid is the same as the thermal storage medium and is in fluid communication therewith. In this example, an intermediate heat transfer loop may be omitted in some cases and the thermal storage media may receive thermal energy directly from the thermal energy generating plant through a single heat transfer loop. The thermal energy plants may be in thermal communication with the thermal energy storage system 702 through one or more heat exchangers, but in some embodiments, a separate heat exchanger is used for each thermal energy plant in order to couple the thermal energy plant to the thermal energy storage system 702. In some instances, this allows multiple thermal energy sources to be added or removed from the system 800 as necessary.

In some embodiments, an auxiliary power system 802 may be coupled to the thermal energy storage system 702. The thermal energy storage system 702 may selectively provide thermal energy to the auxiliary power system 802 which can use the thermal energy to produce power, such as for providing electricity to the one or more nuclear reactors 704, 706, 708. In some cases, the auxiliary power system 802 can provide blackstart capabilities to the one or more nuclear reactors. This may provide the nuclear reactors with dedicated power in the case of a blackout or when starting up the nuclear reactor even when electricity from the electrical grid is unavailable. This provides further decoupling of the nuclear reactors from the balance of plant and provides decoupling from the electrical grid. Of course, the auxiliary power system 802 can provide backup power for any of the thermal energy generating plants, the thermal energy storage system 702, or any other system that benefits from uninterrupted backup power.

The thermal energy storage system 702 may be thermally coupled to an energy conversion system 710, which can produce energy for an external load as described hereinabove. In many instances, the external load 716 will require either thermal energy or electricity, either of which may be provided by the energy conversion system 710. In some cases, the energy conversion system 710 will convert thermal energy to electricity, such as through a steam generator and a turbine. However, in some cases, the thermal energy storage system 702 may provide compressed and heated gas directly to a turbine and omit a steam generator which is typically used in a turbine power generating plant.

For example, the thermal energy storage system 702, or the energy conversion system 710, may use the thermal storage media to heat a working gas, such as nitrogen, argon, or hydrogen, for example. The working gas may be heated and compressed, such as up to 4 atm, or 5 atm, or 6 atm, but in some embodiments, is pressurized to below 4 atm. The working gas may be heated, such as up to 600° C., 650° C., 700° C., 725° C., or 750° C. or more. The working gas may be provided directly to a turbine and the gas can then expand and drive the turbine. In some embodiments, the turbine operates on a Brayton cycle or a regenerative Brayton cycle. The pressure ratio of the gas can be selected and controlled to improve the Brayton cycle efficiency. Of course, other working gasses may be used, such as immiscible salts that vaporize at the working temperature and can be used to drive the turbine.

Figure 9:
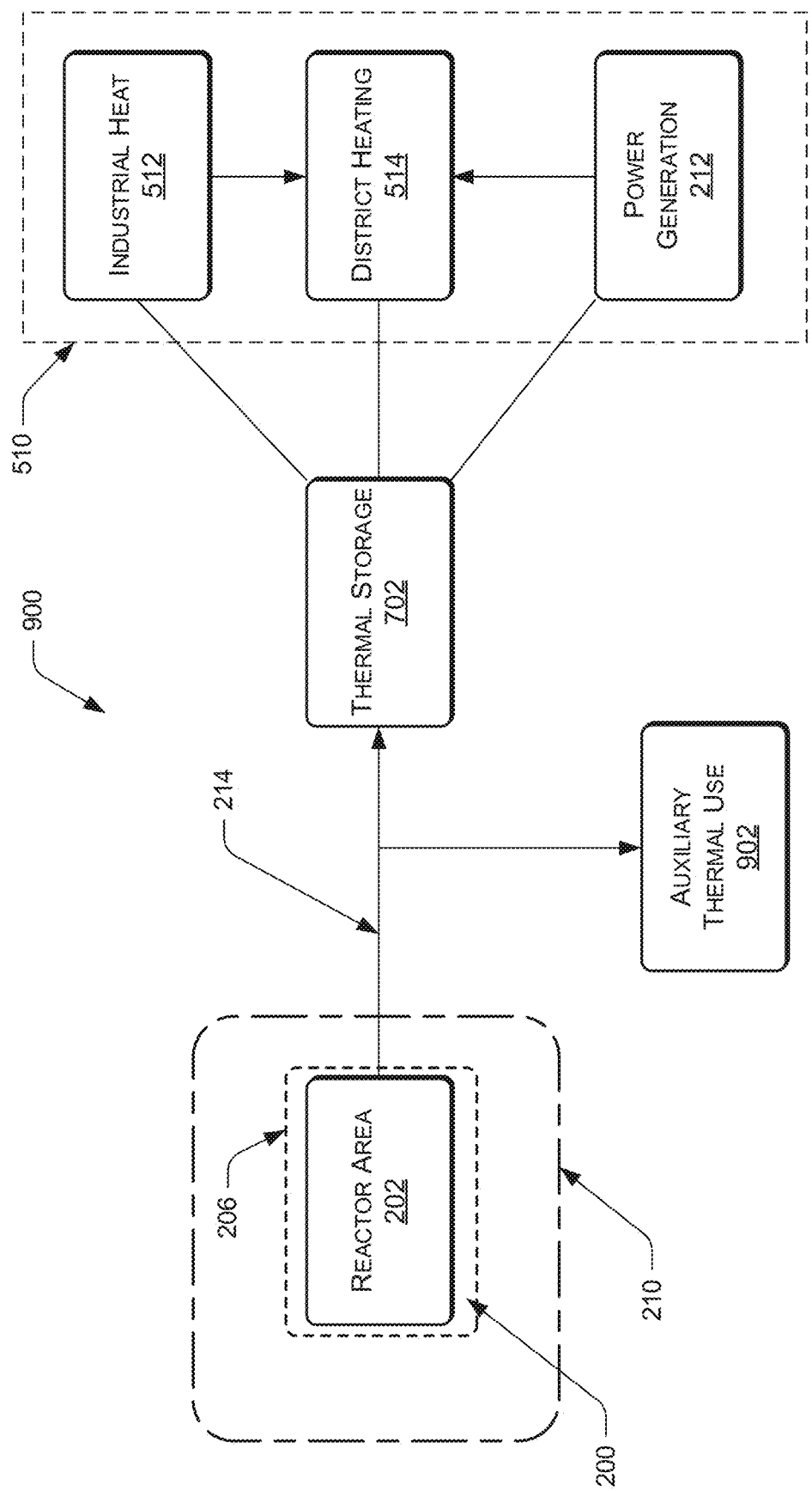
FIG. 9 shows a nuclear thermal plant coupled to a remote thermal storage system coupled to external loads and an auxiliary thermal use, according to some embodiments.

FIG. 9 illustrates an embodiment of an integrated energy system 900 in which a nuclear thermal plant 200 provides thermal energy to a thermal storage system. It should be appreciated that while a single nuclear thermal plant 200 is illustrated, two or more nuclear thermal plants and/or other thermal energy plants can be combined to provide thermal energy to the thermal energy storage system 702. The thermal energy storage system 702, in turn, provides thermal energy to one or more loads 510, which may include power generation 212, district heating 514, or industrial heat 512 loads. In some instances, the load 510 may be relatively low over a period of days or weeks, and the thermal energy storage system 702 may become heat saturated. That is, the thermal energy storage system 702 may not be able to receive any additional heat from the nuclear thermal plant or other connected thermal energy sources. Accordingly, the thermal energy generated by the thermal energy generating plant may be diverted to some other auxiliary thermal use 902 that provides a benefit. In some cases, the excess heat is dumped to the atmosphere; however, in some cases, the excess heat beyond what the thermal storage system is able to receive can be used for other processes, such as, for example, water desalination or hydrogen production, among others. Of course, the auxiliary thermal uses 902 may be supplied thermal energy even in cases where the thermal storage system is not saturated. For example, thermal energy from the thermal energy sources may be provided to both the thermal energy storage system 702 and simultaneously used for auxiliary thermal uses 902.

These auxiliary thermal uses 902 may receive a portion of thermal energy before the thermal energy is delivered to the thermal energy storage system 702, or may selectively receive all the generated thermal energy, such as when the thermal storage system is topped off, or where an auxiliary thermal use 902 is deemed a higher and better purpose for the thermal energy than storing the thermal energy for later use.

In some embodiments, the thermal energy storage system 702 is located at an elevation above the power generation system 212. For example, the thermal energy storage system 702 may be built on a hill so that it is higher in elevation than the power generation plant 212. This arrangement takes advantage of a combined energy storage mode by combining both thermal energy and pressure due to gravity on downstream systems due to the elevation change. A combined energy storage mode increases overall energy density. For example, in a typical steam turbine system, one or more pumps are required to pump the working fluid through the turbine system. The pumps generally are sized to accommodate peak loads and are selected to meet the peak load demands by pumping the working fluid at a higher volume per unit time through the turbine system. By relying on gravity, a system can send additional heat through the steam generator and then to a cold storage tank. In some embodiments, this arrangement may reduce the required size of one or more pumps or eliminate one or more pumps of the steam turbine system.

In some embodiments, currently existing containment sites may be suitable for building nuclear thermal plants to be coupled to a thermal storage system. Currently, there are numerous nuclear reactor sites that are no longer in operation or are slated to be decommissioned and cease operation. These locations may be referred to as brownfield sites, which is nomenclature defined by the Environmental Protection Agency as real property for which the expansion, reuse, or development may be complicated by the presence or potential presence of a hazardous substance, pollutant, or contaminant. Decommissioned nuclear reactor sites are one type of physical site that is within the definition of a brownfield site.

However, nuclear brownfield sites provide several advantages for the systems and methods disclosed or described herein. For instance, nuclear brownfield sites have civil works already in place, such as roads, utilities (e.g., power lines, sewer, water service, etc.), site boundary security, containment buildings, pipes, valves, accessory buildings, and the like. Many of these structures can be reused for a nuclear thermal plant, which greatly reduces the time and cost required to construct and commission a nuclear thermal plant.

Many nuclear brownfield sites have containment structures designed to contain a high-pressure nuclear reactor, such as a light water reactor ("LWR"). These containment structures are designed far in excess of a containment structure that would be required by newer generation nuclear thermal plants, many of which operate at relatively low pressures compared to LWRs. A thermal energy storage system 702 can be located remotely from the nuclear brownfield site and be thermally coupled to the nuclear thermal plant as described herein, such as through heat transfer fluid loops. A passage may be created in the containment structure to allow thermal transport media to exit the containment structure and deliver thermal energy to a thermal energy storage system 702 that is located remotely from the nuclear site.

An existing containment structure may be configured to house one, two, or more nuclear thermal plants. For instance, in a single containment structure, multiple nuclear reactors can be constructed that share the containment structure, fuel handling systems, and other components. A containment structure may be partitioned into two or more reactor rooms for housing multiple nuclear reactors and their concomitant support equipment. Two or more nuclear reactors may share fuel storage areas, subsystems, reactor core fueling/defueling systems, and fuel polishing systems, among others.

In some cases, it is desirable to run a nuclear reactor at full power. The systems and methods described herein allow a nuclear reactor to remain at continuous full power by decoupling the nuclear reactor from the thermal storage and power generation systems. The nuclear reactor may continually supply thermal energy to a thermal storage system, which may be sized to store and provide a greater amount of energy than the nuclear reactor can provide. Thus, the nuclear reactor can slowly "charge" the thermal storage system over time. In the event that the nuclear reactor generates excess heat that the thermal storage system is unable to receive, the excess heat may be diverted and used for auxiliary purposes, such as industrial process heat, fresh water production, hydrogen production, or some other beneficial purpose. Of course, excess heat may alternatively or additionally be dumped to the atmosphere.

Figure 10:
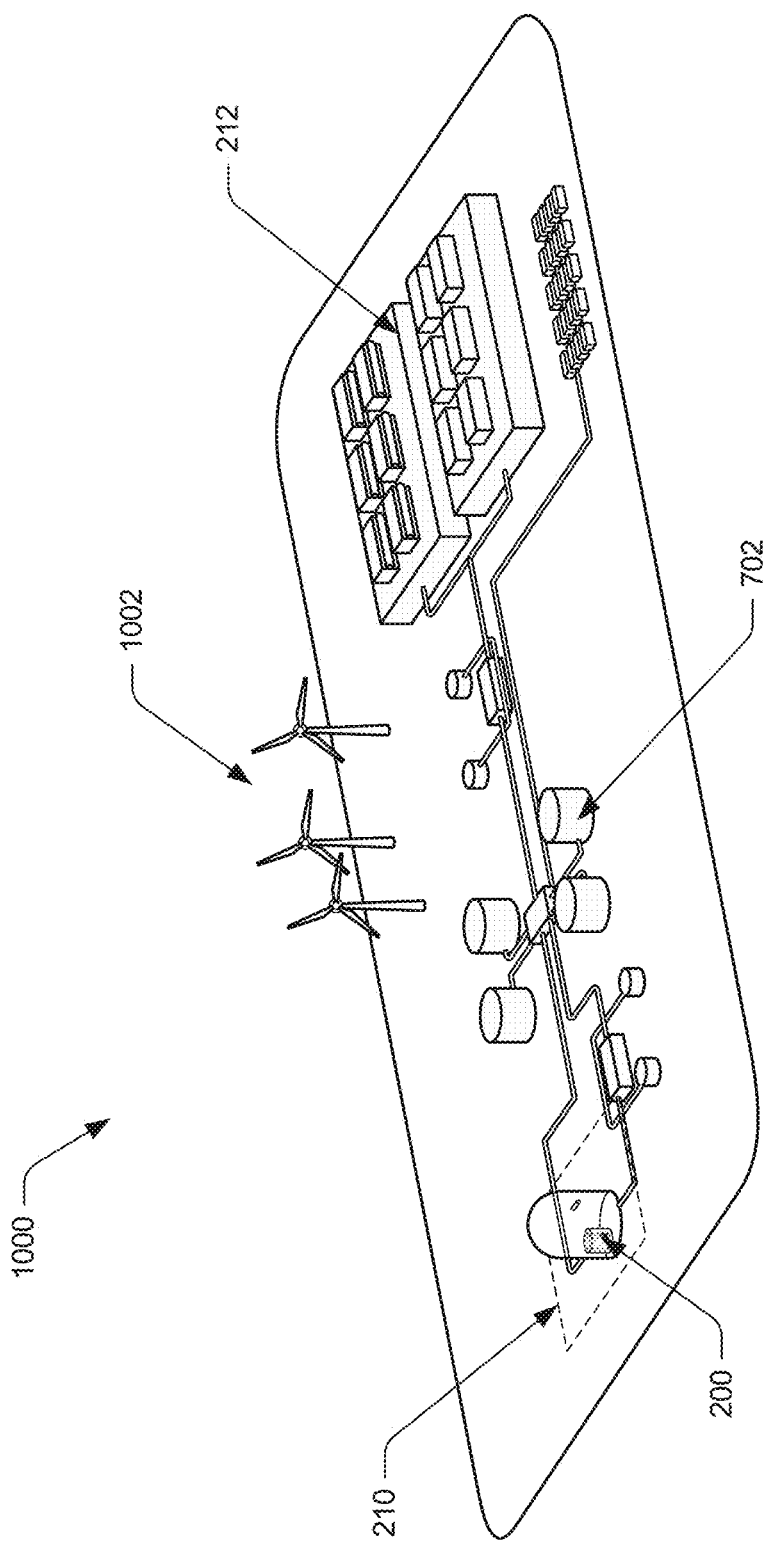
FIG. 10 shows a hybrid energy system in which multiple forms of thermal energy generators are coupled to a common thermal storage system and a common power conversion system according to some embodiments.

FIG. 10 shows an example embodiment of an integrated energy system having a nuclear thermal plant 200 coupled to a thermal energy storage system 702. Additional hybrid energy sources 1002, such as wind power, solar power, geothermal power, wave energy power, or other renewable energy source can likewise be coupled to the thermal energy storage system 702. As illustrated, the nuclear thermal plant 200 is located within the nuclear site boundary 210 and the EPZ, while the remaining systems such as the thermal energy storage system 702 and the power conversion system 212 are located outside the nuclear site boundary 210 and the EPZ.

Traditional application of nuclear plants is electricity generation. However, many newer, Generation IV nuclear plants are designed with outlet temperatures above 500° C., which is significantly higher than the outlet temperatures of light water reactors (LWRs). Therefore, the potential applicability of this high-grade heat extends well beyond electricity generation. In this illustrated architecture, the nuclear reactor 200 is used as a source of heat that is sent to a separate thermal energy storage system 702 which is located outside of the nuclear site boundary 210. In addition to the carbon-free or at least low-carbon emissions combined with the anti-proliferation characteristics of newer nuclear reactors, this integrated energy system 1000 architecture allows numerous beneficial features, such as: (1) reduction in reactor and total system costs, (2) enables flexible electricity demand (load) following as well as "profit following" in grids with larger penetration of renewables; (3) provides high temperature process heat at competitive cost with natural gas, which is not currently possible with LWRs, and (4) enables hydrogen generation through high temperature electrolysis.

These capabilities allow for dramatic carbon reduction in industrial processes and the transportation sector that currently accounts for about 75% of the world's greenhouse gas emissions.

One current obstacle that nuclear plants face is the up-front construction and licensing costs associated with building and starting a nuclear plant. One of the primary cost drivers in nuclear plant construction is not the nuclear technology itself, but rather, the cost of large-scale construction projects regulated by strict nuclear standards. Therefore, it follows that one of the greatest promises for capital cost reduction is not necessarily in the technology advances in the reactor itself, but in plant design. By greatly simplifying and reducing the scope and complexity of the construction project within the nuclear site, as described herein, the primary cost drivers associated with constructing typical nuclear plants decreases dramatically. In the various architecture embodiments described herein, the nuclear plant and the scope of the nuclear construction project is reduced to its most basic form. The simplified reactor becomes a producer of heat energy and is referred to herein as a nuclear thermal plant.

In some embodiments, the interface between the nuclear thermal plant and the rest of the integrated energy system is a heat exchanger and the remaining system components downstream of the heat exchanger are functionally and spatially separated from the nuclear thermal plant. In this architecture, the thermal energy storage, and balance of plant, including power conversion systems, are constructed and operated in a less regulated, less expensive, and fully commoditized environment.

Molten salt thermal storage systems are relatively inexpensive, and in many cases are an order of magnitude less expensive than battery storage and have achieved commercial readiness on GWh scales. Suitable thermal storage systems are currently in use in support of the concentrating solar power industry. Moreover, a very small EPZ is possible due to excellent safety benefits of the advanced nuclear reactors described herein, which enables closer siting of these reactors to the heat consumers.

The described integrated energy system also addresses another challenge facing nuclear power in current and future electricity markets. For instance, as the fraction of power generated by intermittent renewable sources increases, there is large variation in electricity supply with overproduction typically during the 9 am-4 pm time window with solar energy pushing electricity prices down to very low values or even negative territory. Current nuclear plants have typically limited flexibility of rapid load following and, in some cases, are driven to maintain a relatively high capacity factor to achieve low Levelized Cost of Electricity (LCOE). Therefore, even if nuclear power plants could match daily varying power demand, their LCOE is increased making it harder for them to compete with alternative technologies. Salt thermal storage allows many types of nuclear thermal plants to operate at a 100% capacity factor (or very near thereto) and store energy in thermal energy storage tanks, for example, salt tanks, and sell electricity during periods when demand is high and price is also high.

An important consideration in reducing greenhouse gas emissions is the expansion of decarbonization into other industrial processes. Energy consumption, primarily in the form of heat in this sector, is enormous with petroleum and chemicals being major consumers. An integrated energy system as described herein, with its high outlet temperatures of ~510° C.-540° C. or greater, and thermal storage media compatible with these temperatures provides an opportunity to supply heat to a large number of consumers up to temperature of about 500° C., such as petroleum refineries, various chemical plants, soda ash production plants, pulp and paper production plants, food processing plants and others. There is also large potential for co-generation power plants that produce both heat and electricity.

The transportation sector is responsible for the second largest share of global energy consumption after industrial manufacturing. Until recently, transportation has been solely driven by gasoline fuels with no participation of clean nuclear energy in this sector. This is changing with recent arrival of electric vehicles driven by batteries and fuel cells running on hydrogen. An integrated energy system, such as has been described herein, can provide both of these products carbon-free and have significant impact on decarbonization of the transportation sector.

The integrated energy systems described herein can generate hydrogen using high temperature electrolysis and heat. The stored thermal energy can be used to generate steam from water and a hybrid energy, such as electricity, can be used to raise the temperature in an electrolyzer to 750° C.-900° C., such as through Ohmic heating. In some embodiments, the heat exchangers in the electrolyzer can recuperate the heat from hydrogen and oxygen streams to reduce the amount of ohmic heating energy that is needed to keep the electrolyzer temperature at a desired temperature, or in some cases, above a threshold temperature. Moreover, the integrated energy systems described can generate both electricity, such as to charge car batteries, and hydrogen, at the same time. For example, when electricity is not needed, the generated thermal energy can be used to generate additional hydrogen and store hydrogen for distribution over long distances, such as is currently done with gasoline. Unlike GW-scale thermal storage, which is limited to hours-long duration and relatively short transport distances, hydrogen can be stored for much longer times and can be transported over long distances. Therefore, an integrated energy system can be utilized to generate hydrogen, which can be stored for long periods of time, be shipped long distances, and used later as a fuel source.

In some embodiments, a nuclear thermal plant and integrated energy system can be coupled, exclusively, or in part, to a hydrogen generation plant and may use an electrolysis process that utilizes electricity to split water into hydrogen and oxygen. In some instances, the integrated energy system can supply thermal power to generated steam to be used in a hydrogen steam reforming of natural gas process. In some cases, a high temperature electrolysis process is one in which a significant amount of the electrolysis energy can be provided by heat, which reduces the amount of electrical energy, and thus, reduces the cost to generate hydrogen. In some cases, a high temperature electrolysis process utilizes thermal energy having a temperature of about 800° C., which can be provided by an integrated energy system as described herein.

Figure 11:
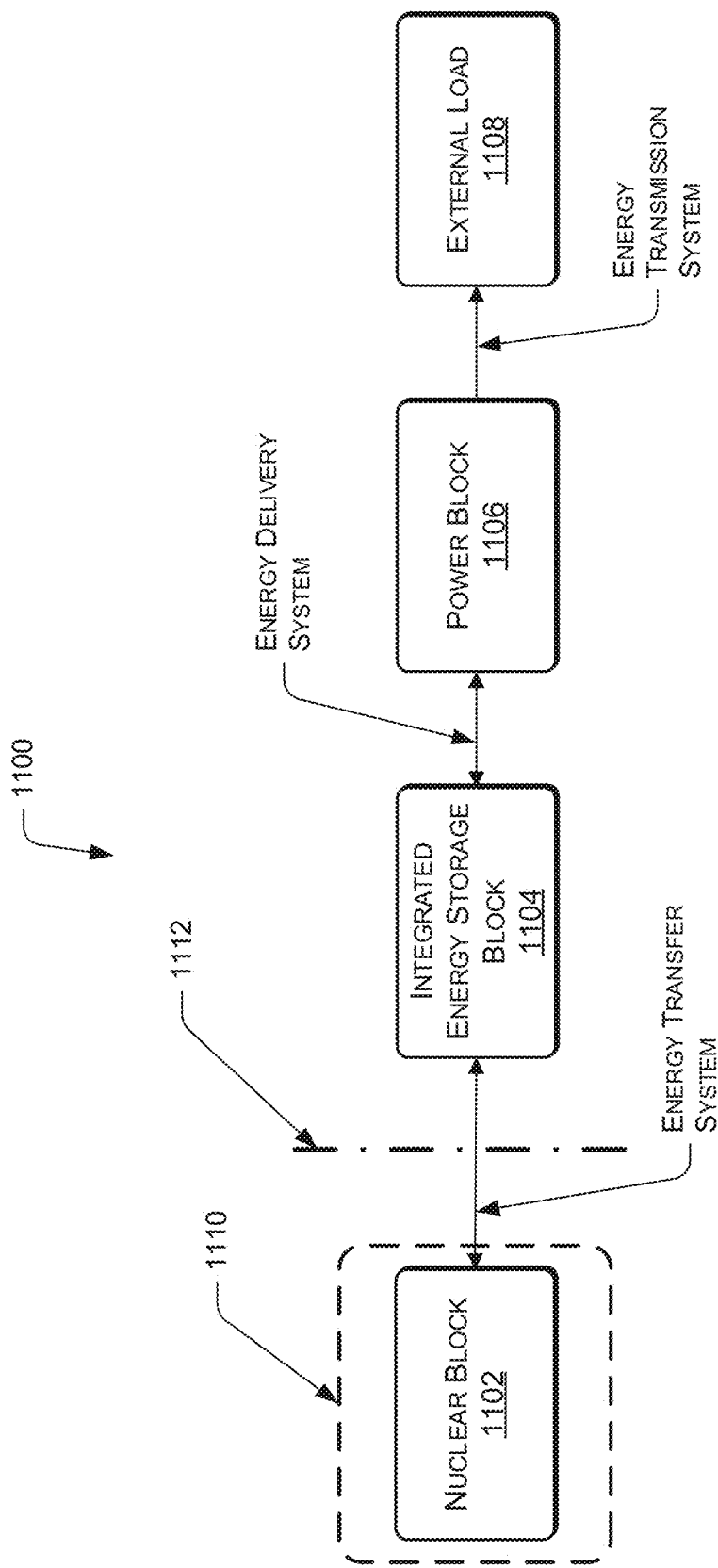
FIG. 11 shows an energy system in which a nuclear block is decoupled from a power block by an integrated energy storage block, in accordance with some embodiments.

FIG. 11 shows an integrated energy system 1100 having a nuclear block 1102 in communication with an integrated energy storage block 1104. The integrated energy storage block 1104 is, in turn, in communication with a power block 1106. The power block 1106 may be in communication with an external load 1108. According to some embodiments, a nuclear block 1102 comprises one or more nuclear reactors, such as a nuclear thermal plant, having a nuclear site boundary 1110 surrounding the nuclear island as has been described herein. One or more nuclear thermal plants may be included as part of the nuclear block 1102, and one or more nuclear thermal plants may be coupled to the integrated energy storage block 1104 and maintain their own separate nuclear site boundaries 1110. The integrated energy storage block 1104 may consist of any suitable thermal storage as described herein, and may include, for example, salt tanks that rely on phase change material to store thermal energy at a stable temperature to receive thermal energy from the nuclear block. The integrated energy storage block 1104, also referred to herein as a thermal storage system or thermal energy storage system, is separated from the nuclear block 1102 by a boundary 1112, which may be defined by the nuclear site boundary 1110. In some instances, the primary communication between the nuclear block 1102 and the integrated energy storage block 1104 is one or more heat exchangers that transmit thermal energy generated by the nuclear block 1102 to the integrated energy storage block 1104.

The integrated energy storage block 1104 is in thermal communication with the power block 1106. The thermal communication may be provided by one or more heat exchangers, which are configured to transmit thermal energy from the integrated energy storage block 1104 to the power block 1106. The power block 1106 may convert the thermal energy into electricity, for example, which may be performed by a turbine such as a steam turbine, or some other type of thermal energy to electricity energy conversion system. The power block 1106 may utilize the thermal energy to generate electricity to transmit to an external load 1108, such as an electrical grid, for example.

As the world moves away from coal fired power plants, for any of a number of multitudinous reasons, the equipment at the decommissioned coal fired power plants can be utilized by other energy sources. As an example, where a coal fired power plant is decommissioned, the equipment downstream of the boiler is agnostic as to the heat source. For instance, the turbine block, switchyards, condensers, generators, and electrical cabling are all still usable with another thermal energy source. These valuable assets, which are orphan assets once the coal fired power plant is decommissioned, create an opportunity for another, carbon-free, thermal energy source to continue to utilize the orphan assets to generate electricity.

According to some embodiments, the coal balance of plant power block (e.g., everything downstream of the boiler), includes equipment such as the boiler drum, the pendant superheater, high pressure turbine, reheaters, intermediate pressure turbine, low pressure turbine, condenser, feed pumps, deaerators, feed heaters, economizer, cooling tower, electrical generator, transformers, and electrical transmission system, along with concomitant piping, instrumentation, and controls. These orphan assets are agnostic as to the source of thermal energy, which can be supplied by an integrated energy storage block 1104 (e.g., thermal storage system), as described herein.

The integrated energy storage block 1104 can receive thermal energy from any of a number of thermal energy sources, such as one or more nuclear thermal plants, solar thermal energy, geothermal energy, wind thermal energy, wave energy, or any other suitable generator of thermal energy. According to some embodiments, the integrated energy storage block 1104 allows any form of thermal energy to be combined and usable with any form of power block 1106 provides the further advantage of decoupling the nuclear block 1102 from the power block 1106.

This architecture offers numerous advantages. For example, there is regulatory separation from the nuclear block 1102 and all the equipment downstream of the integrated energy storage block 1104, there is flexibility in mating a nuclear block 1102 to the power block 1106. For instance, the nuclear block 1102 does not need to match up in terms of power output with the power block 1106. The nuclear block 1102 may operate at full power and transmit thermal energy to the integrated energy storage block 1104, which may then provide thermal energy to drive the turbines of the power block 1106 in any suitable manner. The operation of the power block 1106 is thus completely independent of the operation of the nuclear block 1102.

According to some embodiments, the nuclear block 1102 can be operated at 100% capacity, yet because the nuclear block 1102 is decoupled from the power block 1106 by the integrated energy storage block 1104, the power block 1106 is fully capable of load-following the electricity demand.

The described architecture also leads to advantages in design efficiency. No longer does a nuclear reactor need to be matched to a specific power block 1106. A generic reactor can be mated to a generic power block, which eliminates the need for a new reactor development to power match each arbitrary power block. A generic reactor refers to a reactor of any design and power output. A generic power block refers to any design, size, type, and power output of a thermal energy to electricity conversion system, and includes, by way of example, a steam generator.

In some embodiments, the integrated energy storage block 1104 is designed to accept the output of the nuclear block 1102 and deliver thermal energy according to the demands of the power block 1106. In some embodiments, the described architecture allows for a combination of a single reactor design or multiple reactor designs to be mated to a power block 1106. As an example, if the power block requires 1600 MWth of steam for the turbine, that need can be met with one 1600 MWth reactor, two 800 MWth reactors, one 1200 MWth and one 400 MWth reactor, etc. In some instances, the integrated energy storage block 1104 acts as a power aggregator from the one or multiple reactor designs, thus allowing flexibility, scalability, and timewise independence of the coupling of the power block 1106 to one or more reactors, by relying on the integrated energy storage block 1104 as a buffer. This further allows the nuclear block 1102 and power block 1106 to be completely decoupled and independent in terms of design, construction, and operation. An additional benefit is the architecture allows for the use of a single reactor design, such as a 400 MWth plant, used in conjunction with multiple types of power blocks (e.g., 400 MWth, 800 MWth, 1200 MWth, 1600 MWth, 2000 MWth, 2400 MWth, and the like). In some embodiments, there may be a true mismatch between the nuclear block 1102 and the power block 1106, for example a reactor block 1102 that outputs 1600 MWth can be mated to a 1500 MWth power block 1106. In other words, the nuclear block 1102 may have a thermal power output, and the power block 1106 may have a thermal power input that is larger or smaller than the thermal power output of the nuclear block 1102. Put another way, the reactor block 1102 may have a nameplate capacity that is different from the nameplate capacity of the power block 1106. As used herein, the nameplate capacity is the full-load sustained output of a facility. The nameplate capacity is typically the number registered with regulatory bodies for classifying the power output of a station, and is usually measured in watts, megawatts, or gigawatts. When used to describe a power block 1106, it may be used to refer to the power input to the power block 1106 that can be converted to electricity when the power block 1106 operates at full power.

This type of mismatch can be handled in the ways described herein, such as by using excess thermal energy for other purposes, by scaling the integrated energy storage block, and planning for a nuclear outage while still providing thermal energy to the power block from the integrated energy storage block, or allowing the nuclear block 1102 to charge the integrated energy storage block 1104 during times of reduced electricity demand, to name a few. In some cases, the power block 1106 can be operationally scaled back to a power output lower than 100% power, while the nuclear block 1102 can operate at 100% operational power.

Similarly, a reactor block 1102 can be coupled to an integrated energy storage block 1104 having a mismatch between the nuclear block 1102 thermal power generation capacity and the integrated energy storage block 1104 thermal storage capacity. In other words, the nuclear block 1102 may have a generation capacity that is below the storage capacity of the thermal storage block. In some cases, the reactor block generation capacity may be on the order of 10%, 20%, 30%, 40%, 50%, 60%, 70%, or 80% of the storage capacity of the thermal storage block.

In some cases, the nuclear block 1102 produces thermal energy at a temperature that may not be ideal for the power block 1106. As an example, the nuclear block 1102 may provide an outlet temperature of 500° C., and the power block 1106 may require steam at 550° C. In these cases, the temperature deficiency can be made up by (1) a peaker tank which may heat the thermal storage media to a higher temperature, (2) adding additional thermal energy to the steam before it is sent through the turbines, (3) running the turbines at a lower efficiency, or utilize some other solution for dealing with the temperature mismatch.

In some embodiments, a hybrid technology can be used to supplement the thermal energy of the nuclear block 1102. For example, where the power block 1106 requires an inlet steam temperature greater than the nuclear block 1102 can provide, an alternative technology, such as Ohmic heating, natural gas, hydrogen, or some other energy source, can be utilized to peak the steam temperature to operate the power block 1106 at a suitable efficiency.

According to some embodiments, utilizing orphaned power block 1106 assets in an integrated energy system 1100 in conjunction with a nuclear thermal plant provides numerous benefits. For instance, the site has already been approved and operated, the siting has already been done, it allows hundreds of millions of dollars of equipment to be further utilized in a carbon-free power generation operation rather than be scrapped, and the site is already connected to the transmission infrastructure and connected to the electrical grid, along with other benefits.

The foregoing discussion of combining a nuclear block 1102 and an integrated energy storage block 1104 with orphaned coal power block 1106 assets is equally applicable to orphaned natural gas assets. As a gas-fired power plant is decommissioned for any of a number of multitudinous reasons, the power blocks from these plants can be utilized by coupling the power block 1106 with an integrated energy storage block 1104 that provides thermal energy to drive the turbines of the gas-fired power plant. The integrated energy storage block 1104 can receive thermal energy from any of a number of different sources, such as one or more nuclear reactors, solar thermal energy, wind energy, geothermal energy, hydro-energy, or any other suitable source of thermal energy.

In some instances, where the power block 1106 requires temperatures higher than the output temperature of the integrated energy storage block 1104, a decommissioned gas-fired power plant will have an available source of natural gas that can be used to peak up the temperature of the thermal storage media, or the turbine working fluid, in order to improve the efficiency of the turbine cycle. Additionally, the power block 1106 itself can generate electricity at a lower efficiency due to the less than optimal inlet steam pressure, and divert some of the generated electricity to peak the temperature of the inlet steam and gradually increase its efficiency as the inlet steam is raised to a more ideal temperature for the power block.

According to some embodiments, brownfield sites provide an opportunity to utilize the orphaned equipment by combining it with an integrated energy storage block 1104 and a nuclear block 1102. By utilizing the existing infrastructure available on a brownfield site, it allows for an otherwise difficult to use site to be remediated and developed into a carbon-free energy producing facility at much lower cost than new construction, with less time and cost in licensing and commissioning, and the site can be redeveloped into a positive use.

Figure 12A:
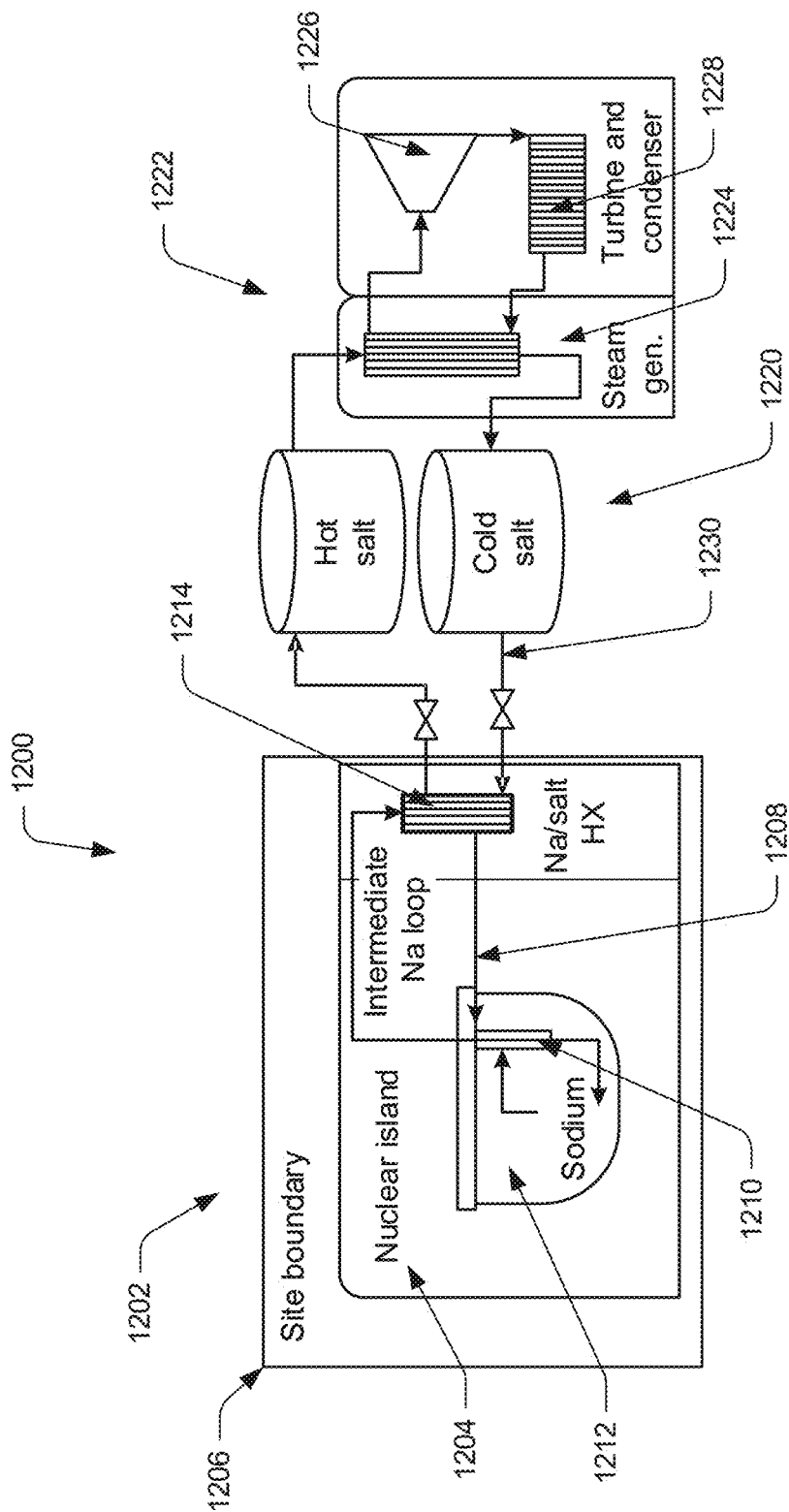
FIG. 12A shows an integrated energy system with a nuclear thermal plant, in accordance with some embodiments.

With reference to FIG. 12A, an integrated energy system 1200 with a nuclear thermal plant 1202 is shown. As an exemplary illustration, a sodium cooled reactor is illustrated; however, it should be recognized that any type of nuclear reactor may be utilized with the systems and architectures described herein. A sodium cooled reactor is located within a nuclear island 1204, which comprises nuclear containment. A nuclear site boundary 1206 surrounds the nuclear island 1204 and within the nuclear island 1204 and the site boundary 1206 is an intermediate thermal loop 1208, which in the illustrated example is a sodium loop. In some sodium-cooled reactors, the intermediate thermal loop 1208 is preferable for several reasons. For example, sodium and water/steam interact in an energetic way. The intermediate loop 1208 in sodium cooled reactors is typically necessary to separate the highly radioactive primary sodium within the reactor vessel with steam, such as in case of rupture of a steam generator tube. The sodium within the intermediate thermal loop 1208 is activated by neutron flux as it travels through the primary heat exchanger 1210 located in the reactor vessel 1212 and becomes radioactive, but to a much smaller extent than the primary sodium in the reactor vessel 1212.

In some nuclear reactor embodiments, the primary heat exchanger 1210 transfers thermal energy from the primary sodium coolant within the reactor vessel 1212 to sodium coolant in the intermediate thermal loop 1208. In many cases, the primary heat exchanger 1210 is a sodium/sodium heat exchanger. The intermediate thermal loop 1208 may then transfer thermal energy to another thermal transfer medium, which may be salt, such as in the illustrated example, within the intermediate heat exchanger 1214. The salt then transfers thermal energy to the thermal storage system 1220 for storage and use by the power conversion system 1222. The power conversion system 1222 may include one or more steam generators 1224, and one or more turbines 1226 and condensers 1228 which may be used for electricity generation. One effect of the illustrated intermediate thermal loop 1208 is to maintain a separation between the sodium and steam cycle. The intermediate thermal loop 1208 also reduces or prevents salt activation by locating the salt loop 1230 remotely from the nuclear reactor vessel 1212 and the nuclear core.

Figure 12B:
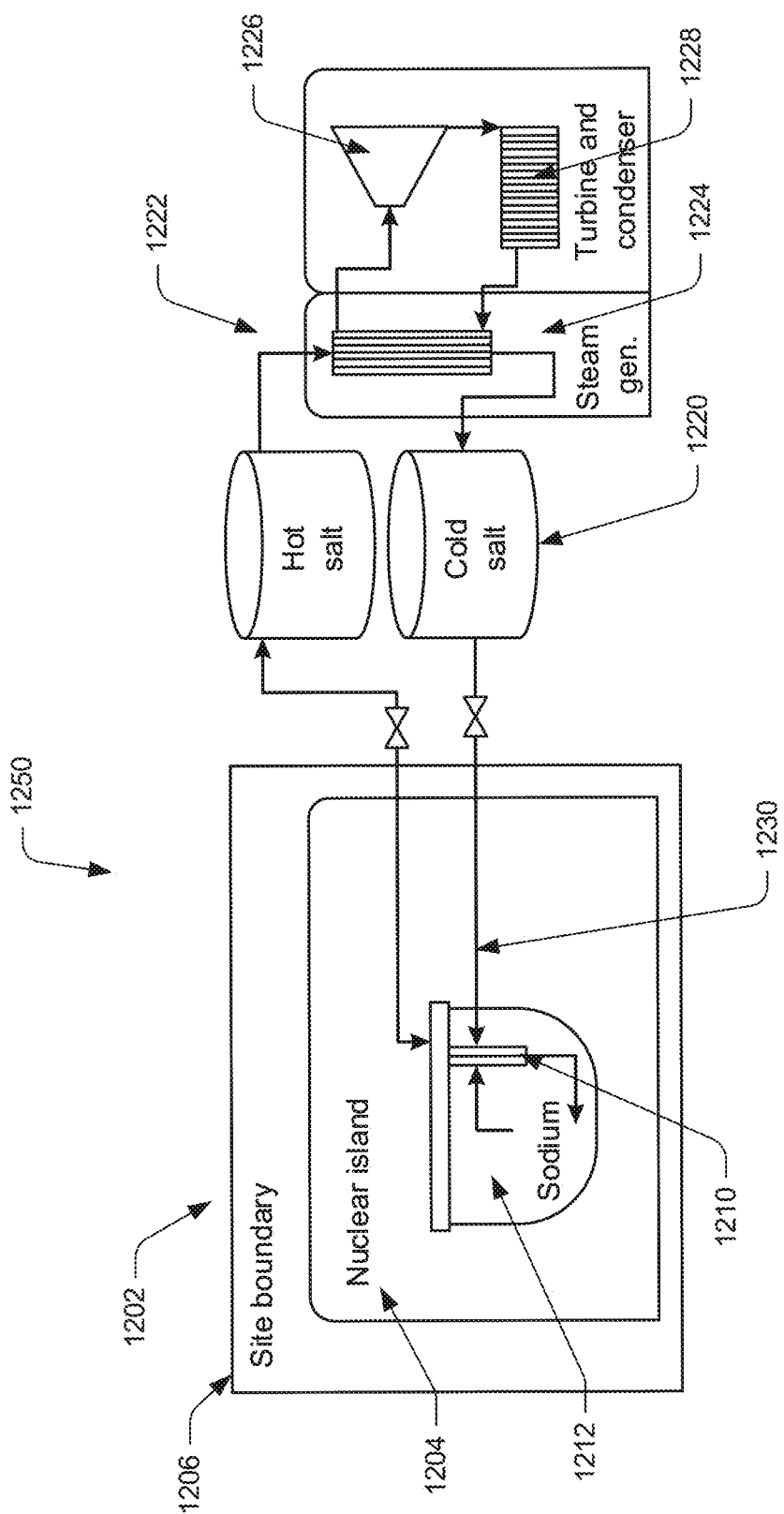
FIG. 12B shows an integrated energy system with a nuclear thermal plant in which the intermediate thermal loop has been eliminated from the system architecture, in accordance with some embodiments.

FIG. 12B shows an integrated energy system 1250 with a nuclear thermal plant 1202 in which the intermediate thermal loop has been eliminated from the system architecture. For example, the primary coolant loop within the reactor vessel 1212 is in direct thermal communication with the heat transfer loop 1230 of the thermal storage system 1220. Eliminating the intermediate thermal loop simplifies construction, piping, valves, and reduces cost. This is accomplished, at least in part, by a salt system architecture that receives thermal energy from the primary heat exchanger 1210 in the nuclear reactor vessel, thus maintaining separation between the sodium loop and the steam cycle of the power conversion system.

However, an additional consideration is neutron activation of the salt system due to the heat transfer media (e.g., salt) passing through the primary heat exchanger 1210 in the reactor vessel 1212.

Figure 13A:
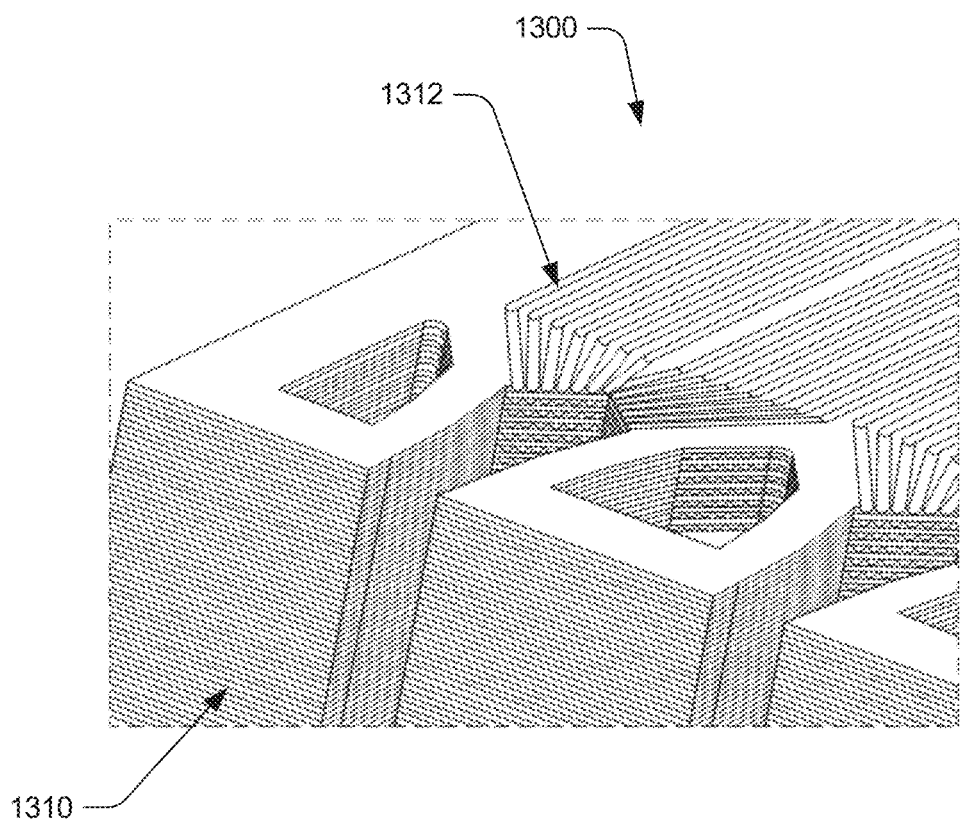
FIG. 13A shows a perspective view of an embodiment of a compact heat exchanger, in accordance with some embodiments.
Figure 13B:
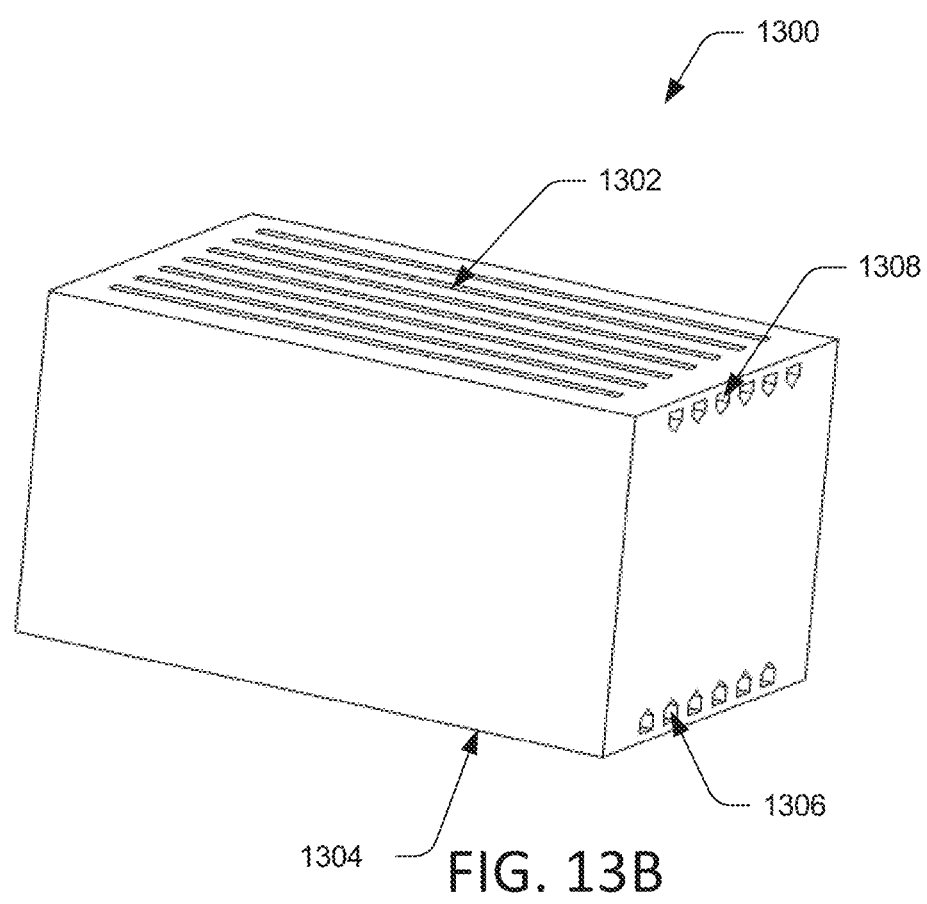
FIG. 13B shows a perspective view of an embodiment of a compact heat exchanger, in accordance with some embodiments.

FIGS. 13A and 13B illustrate embodiments of a compact heat exchanger ("CHX") 1300 in accordance with some embodiments. A compact heat exchanger 1300 may be a printed circuit heat exchanger, a plate heat exchanger, a formed plate heat exchanger, or a hybrid heat exchanger, in which two or more media flow on opposite sides of one or more bonded plates. The cooling media may be under high pressure, but in some embodiments, its at low pressure. The working fluids, which in some embodiments are sodium and salt, may be caused to flow on both sides of the one or more bonded plates through 2D or 3D plate patterns. The 2D or 3D plate patterns can be configured to produce the desired thermal length and pressure drop. As used herein, sodium and salt will be used as exemplary working fluids within the CHX with sodium used as a cooling fluid within the reactor core and salt is used as a heat transfer fluid to transfer thermal energy outside the reactor vessel. In some embodiments, the CHX is used in conjunction with a sodium pool nuclear reactor.

A sodium inlet 1302 is formed adjacent one side of the CHX and a sodium outlet 1304 may be formed on an opposing side of the CHX. In some embodiments, the sodium inlet 1302 may be adjacent a top surface of the CHX and the sodium outlet 1304 may be adjacent a bottom surface of the CHX in an installed configuration within a reactor vessel. In some embodiments, the sodium inlet 1302 may be higher than the sodium outlet 1304. However, in other embodiments, the sodium inlet 1302 may be on or adjacent to any side of the CHX and the sodium outlet 1304 may be adjacent to or on any other side of the CHX. In many instances, the sodium inlet 1302 and sodium outlet 1304 are on opposing sides of the CHX.

A salt inlet 1306 may located on or adjacent to one side of the CHX 1300, which may be a side orthogonal to the side configured with the sodium inlet 1302. A salt outlet 1308 may be formed on the same side as the salt inlet 1306 to accommodate the salt loop piping that may enter and exit on the same side of the reactor vessel. However, the salt inlet 1306 and salt outlet 1308 may be formed on different surfaces of the CHX 1300.

The CHX 1300 may be formed of a series of parallel plates 1310 having surface grooves 1312 that are placed adjacent one another so as to form a series of channels when the plates 1310 are bonded together. The surface grooves 1312 may be photochemically etched, mechanically formed, or formed through some other process, into the surface of the plate and sized and arranged to provide the desired flow characteristics such as fluid path length and pressure drop.

In many cases, the plates 1310 are diffusion bonded to one another, which is a solid-state welding process that returns the bonds to the parent metal strength, permits excellent thermal-hydraulic performance, and allows for design optimization of 2D and/or 3D fluid pathways through the CHX 1300.

In some embodiments, a header or manifold (not shown) may be attached to the fluid inlet or outlet that provides a fluid communication path through all the layers of the CHX simultaneously. Alternatively, or in addition, ports can be configured during the plate formation stage to provide integral headers in the CHX 1300. In some cases, a CHX 1300 may be semi-ported with a mixture of headers and ports that are connected by manifolds.

A CHX 1300 may be formed of any suitable material and formed of a suitable size for the intended application. In many cases, a CHX 1300 may be formed to be substantially smaller than a shell and tube heat exchanger for the same application. In other words, when used within a nuclear reactor vessel, a CHX 1300 designed as a sodium/salt heat exchanger may be substantially smaller than a shell and tube heat exchanger configured for sodium/salt heat transfer having similar thermal energy transfer capabilities. In some cases, the CHX 1300 requires about seven times less volume than a comparable shell and tube heat exchanger for a similar application.

In the illustrated example, primary sodium flows through open slots from a sodium inlet 1302 formed in the upper surface downward through channels formed between plates in the CHX 1300 to the sodium outlet 1304 formed in the bottom surface of the CHX 1300. Salt enters a salt inlet 1306 and is distributed to cold channels through distributors and flows upward within channels formed in the CHX 1300 and exits a salt outlet 1308. A configuration such as this, where hot fluids enter/exit from near the top of the CHX and cold fluids enter/exit near the bottom of the CHX takes advantage of natural convections cycles to encourage efficient fluid flow.

An allowable pressure drop can be specified, and lower pressure drops are typically desirable to reduce operating cost and improve cycle efficiency. In some embodiments, the sodium pressure drop across the CHX is less than about 6 psi, or less than about 5 psi, or less than about 4 psi, or less than about 3 psi. A lower pressure drop may typically require a short flow length and a low viscosity, which directly impacts that heat transfer coefficient. The pressure drop can be tuned by varying the flow length, the fluid viscosity, and/or the flow width, and overall heat transfer can likewise be affected by varying the number of layers and the heat transfer area.

The plate surface types can be tailored for the specific purpose and may be formed to enhance surface density and heat transfer coefficients and may be formed as fins having any suitable arrangement, such as serrated, herringbone, or perforated. Of course, other arrangements are possible and contemplated herein. In combination, or in the alternative, passageways may be created directly in the plates through any suitable manner, but in some cases, by photochemical etching.

The passageways may be any suitable size and cross-sectional shape. In some embodiments, the formed channels are semi-circular with a radius of about 0.5 mm, or about 0.75 mm, or about 1 mm. Of course, other suitable cross-sectional shapes and sizes are contemplated in accordance with design flow parameters of the CHX.

Figures 14A, 14B:
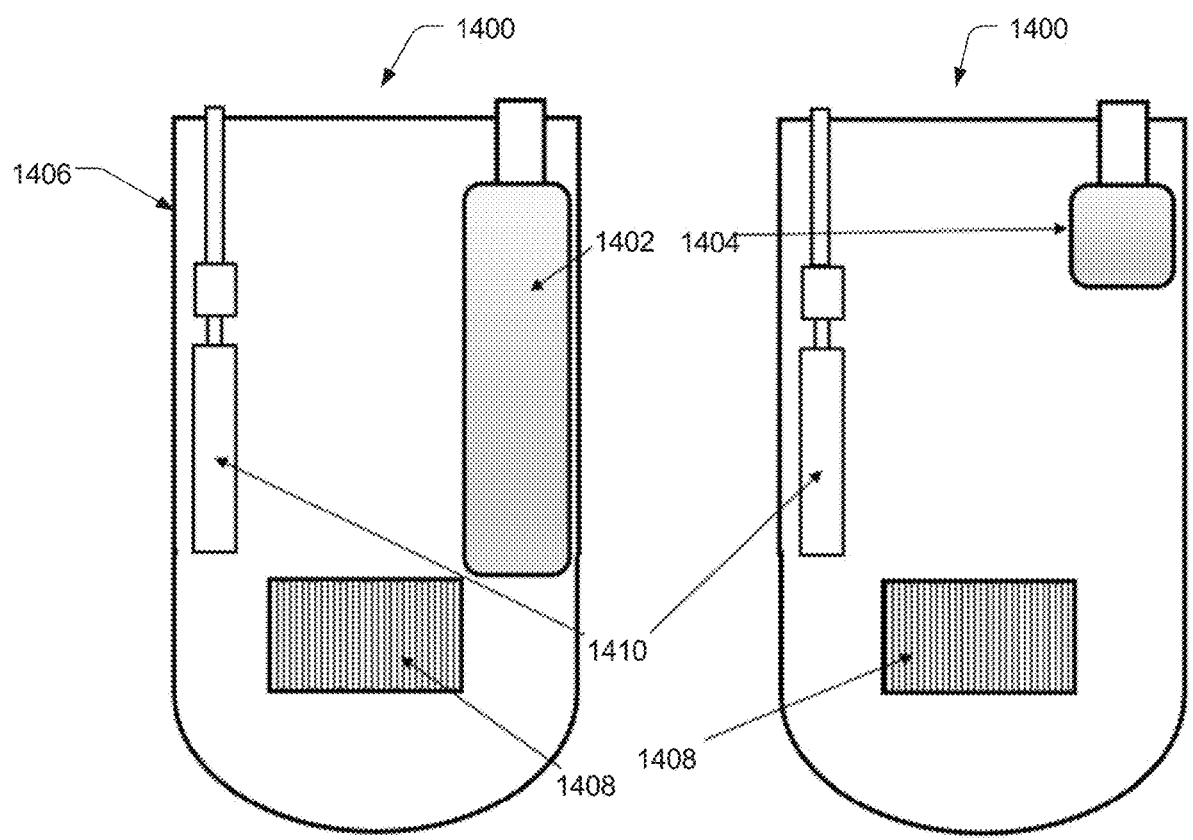
FIG. 14A shows a schematic view of a nuclear thermal plant with a shell and tube heat exchanger, in accordance with some embodiments.
FIG. 14B shows a schematic view of a nuclear thermal plant with a compact heat exchanger, in accordance with some embodiments.

FIGS. 14A and 14B illustrate a relative size differential between a sodium/sodium shell and tube heat exchanger 1402 (FIG. 14A) and a sodium/salt CHX 1404 (FIG. 14B). Notably, a sodium/salt shell and tube heat exchanger is significantly larger than the sodium/sodium shell and tube heat exchanger illustrated in FIG. 14A.

FIG. 14A illustrates a schematic view of a nuclear reactor 1400 having a shell and tube heat exchanger 1402 designed for sodium/sodium heat transfer. As can be seen, the sodium/sodium heat exchanger 1402 is one of the largest components within the reactor vessel 1406, and is a major design factor in designing the nuclear reactor 1400. In fact, the sodium/sodium heat exchanger 1402, in large part, determines the height of the reactor vessel 1406, which in turn, affects the overall size of the containment structure and other components.

Moreover, shielding the sodium/sodium heat exchanger 1402 is difficult and expensive since the sodium/sodium heat exchanger 1402 is adjacent to the core 1408 where it receives a relatively high neutronic activity. Shielding is difficult due to space constraints within the reactor vessel 1406 and due to the size of the heat exchanger 1402. When replacing the shell and tube sodium/sodium heat exchanger 1402 with a shell and tube sodium/salt heat exchanger, the noted considerations are exacerbated because a sodium/salt shell and tube heat exchanger is significantly larger than the illustrated sodium/sodium shell and tube heat exchanger 1402.

In many typical configurations, coolant salt has about a 100× lower thermal conductivity than sodium. Consequently, a sodium/salt shell and tube heat exchanger requires a heat exchanger that is substantially larger than a sodium/sodium heat exchanger. In some instances, a sodium/salt heat exchanger is over twice the height of the sodium/sodium shell and tube heat exchanger. In some cases, it may be advantageous to utilize a sodium/salt heat exchanger in those embodiments, where salt is a working fluid such as in an integrated energy system and salt is the thermal energy storage medium. By relying on a sodium/salt heat exchanger, the typical intermediate sodium loop that receives thermal energy from the primary coolant in the reactor vessel 1406 and delivers it to a salt loop outside the reactor vessel 1406 may be eliminated. However, any gains realized from eliminating the intermediate sodium loop are quickly lost since the reactor vessel 1406 must be considerably larger (e.g., 2× taller) in order to facilitate the sodium/salt heat shell and tube exchanger. Likewise, the containment structure must also be increased in size to accommodate the larger reactor vessel 1406.

In some embodiments, the heat exchanger within the reactor vessel 1406 plays a prominent role in the size of the reactor vessel 1406. By reducing the size of the heat exchanger, the reactor vessel can be reduced in size accordingly. In some embodiments, a compact heat exchanger 1404 is used as a primary sodium/salt heat exchanger in the reactor vessel 1406.

As can be seen in FIG. 14B, one or more CHXs 1404 can be located within the reactor vessel 1406 at a location that is spaced a distance from the core 1408. In some cases, the spacing is significant in terms of radiation exposure. For example, the further from the core 1408 the CHX 1404 is spaced, the less radiation the CHX 1404 is exposed to. Consequently, the further the CHX 1404 is placed from the core 1408, the less shielding is required in order to reduce salt activation within the salt loop. In addition, a longer distance of the CHX 1404 from the core 1408 improves natural circulation of the sodium within the reactor vessel 1406 and the circulation pump 1410 may be able to be reduced in size, thus gaining additional efficiencies and size benefits. In some cases, utilizing one or more CHXs 1404 in the reactor vessel 1406 allows a nuclear reactor to output a greater amount of thermal energy, or be reduced in size without sacrificing the amount of thermal energy output.

As compared with the shell and tube heat exchanger 1402 from FIG. 14A, in which the heat exchanger is adjacent the core and requires large amounts of shielding in order to reduce activation of the heat transfer fluid, the CHX 1404 is small and is spaced further from the core 1408, which reduces the amount of shielding required. The CHX 1404 thus allows a pool reactor design with significant simplification of design, construction, shielding, piping, and cost required. In some embodiments, the CHX is used with a pool type reactor. In some embodiments, the pool type reactor is a sodium pool type reactor. In some cases, the sodium pool type reactor operates in the fast neutron spectrum.

In some embodiments, the pressure of the salt loop within the CHX 1404 is at a higher pressure than the pressure in the sodium loop of the CHX 1404. As a consequence, any leaks in the CHX 1404 will cause the salt to flow into the sodium. In some cases, the reaction products of the salt and sodium combination may have tendency to plug any leaks in the CHX 1404, thus providing inherent safety in the case of failure of a component of the CHX 1404. Moreover, any potential leaks in the CHX 1404 may be detected in the cover gas system of the nuclear reactor. The size and location of the CHX 1404 facilitates removal and replacement of the CHX 1404, thus increasing efficiency in maintenance and replacement of the CHX 1404 in comparison with a shell and tube heat exchanger 1402.

In some embodiments, multiple CHXs can be utilized in a pool type nuclear reactor. As previously described, the sodium inlet may be located at a higher elevation on the CHX with the sodium outlet located at a lower elevation on the CHX. A salt inlet and outlet may be located on a same side of the CHX, and may be located to facilitate efficiency in installation, piping, and optional replacement of the CHX. In some embodiments, the salt inlet and outlet may be provided by a coaxial inlet and outlet pipe. Of course, other configurations are possible, such as separate, non-coaxial pipes, as well as other arrangements of the salt inlet and outlet, which may be located on adjacent, or opposite sides of the CHX 1404.

The sodium outlet from two or more CHX's may merge into a single sodium outlet that returns cooled sodium to the core. By utilizing salt as the working fluid to receive thermal energy from the nuclear reactor and transfer it to the thermal storage system, additional sodium loops are eliminated, which also ameliorates the necessity of large sodium pipes with sodium fire protection and shielding, thus further simplifying construction and associated costs.

While the example CHX 1404 has been described with a sodium pool reactor, the features and benefits described herein may be equally applicable to other reactor types. Likewise, while the described cooling media uses salt as an example, this is exemplary and other media and media types are possible.

Figure 15:
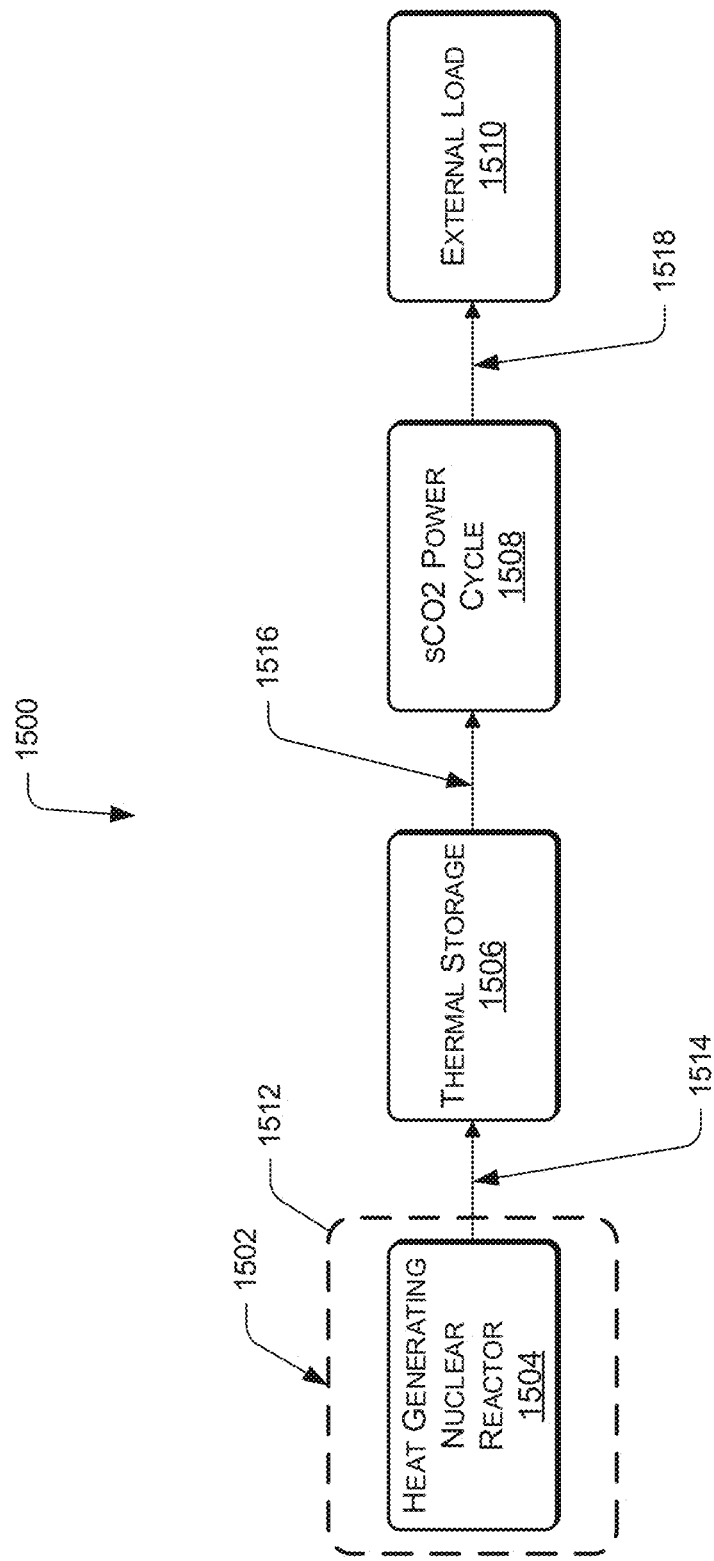
FIG. 15 shows a schematic view of an integrated energy system utilizing a supercritical carbon dioxide power cycle, in accordance with some embodiments.

FIG. 15 illustrates an integrated energy system 1500 having a nuclear thermal plant 1502 that comprises a heat generating nuclear reactor 1504. The nuclear reactor 1504 is in thermal communication with a thermal storage system 1506. The thermal storage system is in thermal communication with an energy conversion system 1508, which is in communication with an external load 1510.

The heat generating nuclear reactor 1504 is substantially as described herein and may be any suitable type of nuclear reactor now known or later developed. Furthermore, the heat generating nuclear reactor 1504 may comprise any suitable size of nuclear reactor, such as a small modular reactor, a micro reactor, and up to a gigawatt size reactor, or larger. Moreover, one or more reactors, which may be the same type of reactor, or different types and sizes of reactor, may be utilized in an integrated energy conversion system.

The nuclear reactor 1504 is surrounded by a nuclear site boundary 1512, substantially as described herein. Located outside the nuclear site boundary 1512 is the thermal storage system 1506. As described, the thermal storage system 1506 may be any suitable type of thermal storage system 1506 and can utilize any suitable type of thermal storage media. For example, the thermal storage media may comprise eutectic solutions, phase-change materials, miscibility gap alloys, mixtures of metals (e.g., $AlSi_{12}$), cement-based materials, molten salt (e.g., chloride salts, sodium nitrate, potassium nitrate, calcium nitrate, NaKMg, or NaKMg—Cl, among others), solid or molten silicon, or combinations of these or other materials.

In some examples, the thermal storage media is also used as the heat transfer fluid within the energy transfer system 1514 and/or the energy delivery system 1516. In this way, the energy delivery system 1516 may be in fluid communication with the energy conversion system 1508 and the heat delivery fluid of the energy delivery system 1516 may directly interact with the thermal storage medium of the thermal storage system 1506. Similarly, in some examples, the energy transfer system 1514 may use a heat transfer fluid that is the same as the thermal storage medium of the thermal storage system 1506. In some cases, the thermal storage system 1506 may be in direct fluid contact with the energy transfer system 1514, the energy delivery system 1516, or both.

The thermal storage system 1506 is in thermal communication with the nuclear reactor 1504 by the energy transfer system 1514 that may be thermally coupled to the nuclear reactor 1504 and to the thermal storage system 1506 by one or more heat exchangers. The energy transfer system 1514 transfers thermal energy, typically through insulated conduits, to the thermal storage system 1506, where the thermal energy is stored until it is needed.

The thermal storage system 1506 is in thermal communication with the energy conversion system 1508, such as by the energy delivery system 1516. The energy conversion system 1508 may be any suitable type of now-known or later developed technology that is capable of converting thermal energy into another form of useful energy. In some examples, the energy conversion system 1508 is a supercritical CO2 (sCO2) power cycle that utilizes an sCO2 turbine, which may operate on the Brayton cycle, to convert the sCO2 into mechanical work. In many instances, sCO2 is sent through a turbine that rotates the shaft of a generator to create electricity. sCO2 has a greater energy density than steam, which translates into smaller system components to result in a similar net output to a larger steam turbine. Further, by using sCO2 as the working fluid and eliminating the steam generator entirely, the system requires far less capital construction cost. Moreover, sCO2 is non-explosive, non-flammable, non-toxic, and relatively inexpensive.

In some embodiments, the sCO2 is heated by the salt from the thermal storage system 1506, such as by a heat exchanger. The sCO2 is expanded in the turbine thus turning the turbine to create mechanical shaft work. The CO2 exiting the turbine is cooled in a heat exchanger to a desired compressor inlet temperature, and the CO2 is sent back to the heat exchanger to be reheated by the salt and the cycle repeats. Other system architectures are contemplated, such as a system in which the thermal storage system 1506 is eliminated, or bypassed, in order to delivery thermal energy from the nuclear reactor 1504 directly to the sCO2 power cycle system 1508.

The sCO2 power cycle system 1508 may be coupled to an external load 1510, which may be a utility electrical grid, such as by an energy transmission system 1518. The sCO2 power cycle system 1508 can deliver the generated electricity to the electrical grid, such as by high voltage transmission lines that carry the power from the sCO2 power cycle system to demand centers. Notably, the energy conversion system 1508 is remote from the nuclear reactor, and in many cases is outside the nuclear site boundary 1512, and in many cases, is also outside the EPZ. As described, the nuclear reactor 1504 is decoupled from the energy conversion system 1508 and any faults at the sCO2 power cycle system 1508 do not negatively impact the nuclear reactor 1504, and vice versa. In fact, even when the nuclear reactor 1504 is shut down, such as for maintenance or refueling, the thermal storage system 1506 is able to continue to deliver thermal energy to the sCO2 power cycle system 1508 for supplying electricity to the external load.

Figure 16:
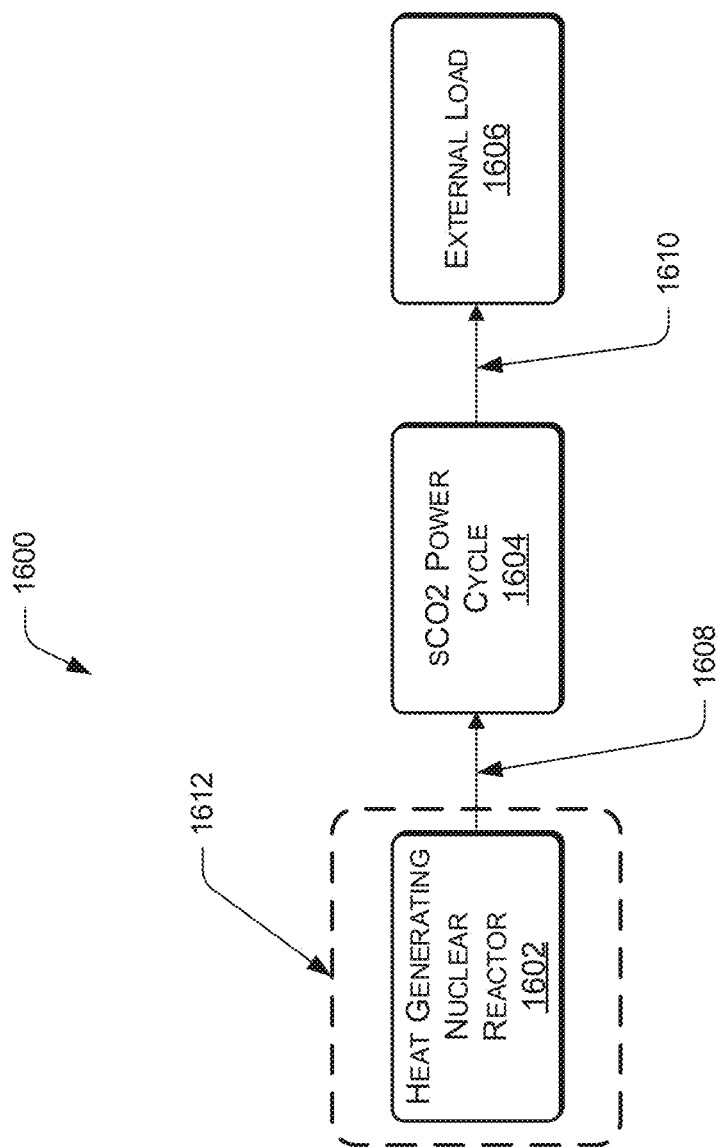
FIG. 16 shows a schematic view of a nuclear thermal plant coupled to a remote supercritical carbon dioxide power cycle, which is coupled to an external load; in accordance with some embodiments.

FIG. 16 illustrates an integrated energy system 1600 having nuclear thermal plant 1602 coupled directly to a sCO2 Power Cycle 1604, which in turn, may be coupled to an external load 1606 by an energy transmission system 1610. In this example, the energy transfer system 1608 may comprise salt, which is heated by the nuclear reactor 1602, substantially as described herein, and is delivered to the sCO2 Power Cycle system 1604 where it is used to heat CO2 to supercritical conditions to drive the sCO2 turbine. The sCO2 Power Cycle system 1604 may provide a base load demand, and any excess thermal energy created by the nuclear thermal plant 1602 may be diverted and used for other thermal processes. The sCO2 power cycle system 1604 may be located outside the nuclear site boundary 1612, and outside the emergency planning zone of the nuclear reactor 1602. The nuclear reactor 1602 in the illustrated embodiments may be any suitable reactor as described herein.

Figure 17:
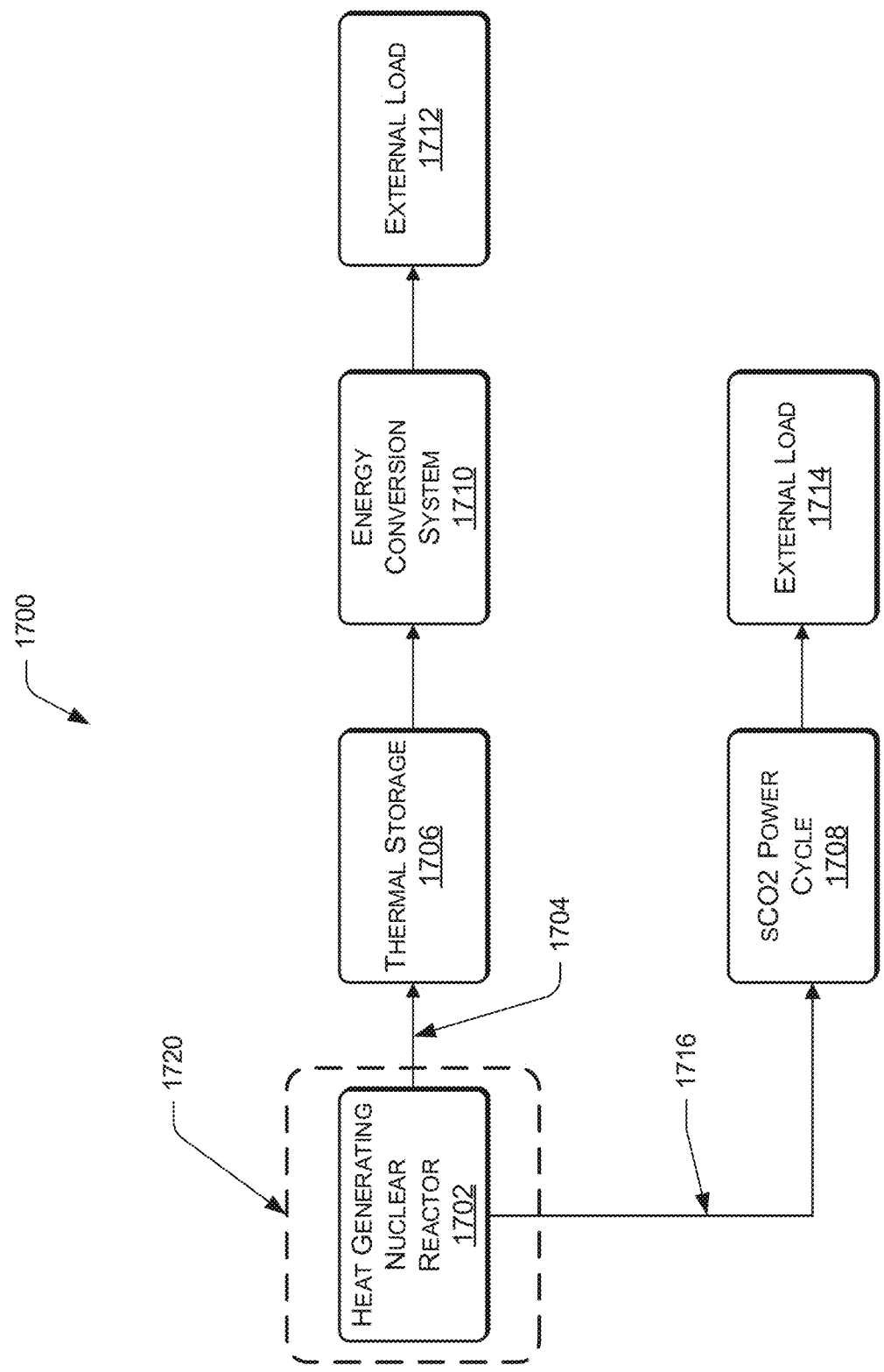
FIG. 17 shows a schematic view of an integrated energy system in which a nuclear thermal plant supplies thermal energy to a thermal storage system and a power cycle system, in accordance with some embodiments.

FIG. 17 illustrates another system architecture of an integrated energy system 1700 in which a nuclear thermal plant 1702 generates heat, which is transferred to an energy transfer system 1704, such as by a heat exchanger in the reactor vessel. The energy transfer system 1704 uses a working fluid to transfer thermal energy. In some cases, the working fluid is salt, but may be other fluids. The nuclear thermal plant 1702 and the thermal storage system 1706 may be any suitable systems and may be similar or identical to similar systems described in other embodiments herein.

The working fluid in the energy transfer system 1704 may bifurcate and deliver thermal energy to multiple systems. As shown, a first portion of thermal energy may be delivered to a thermal storage system 1706, and a second portion of the thermal energy may be delivered to a sCO2 Power Cycle 1708. In some instances, the thermal energy delivered to the thermal storage system 1706 may be utilized as substantially described herein, such as by driving an energy conversion system 1710 which may be a steam turbine system used to generate electricity to be supplied to an external load 1712.

Thermal energy delivered to the sCO2 power cycle 1708 may be used for any suitable purpose, but in some cases, may be used to provide electricity for an external load 1714. In some instances, the external load 1714 is the base load electricity demand, and the sCO2 power cycle 1708 may be operated at a level to meet the base load electricity demand. Another electricity source, such as the energy conversion system 1710, which may be a steam generator, can be used to meet peak electricity demands, or vice versa.

In some embodiments, a first energy transfer system 1704 delivers energy to the thermal storage system 1706 using a first working fluid. A second energy transfer system 1716 may deliver thermal energy to the sCO2 power cycle 1708 utilizing a second working fluid. In some embodiments, the second working fluid may be CO2, which is superheated by the heat generating nuclear reactor 1702 and sent to the sCO2 power cycle 1708, which uses the sCO2 directly. In some embodiments, the sCO2 power cycle 1708 may be used to provide electricity for one or more nuclear reactors. In this way, the one or more nuclear reactors do not need to rely on the electrical grid for electrical power in the case that electricity from the grid is unavailable, but the nuclear reactors can be decoupled from the grid and be self-sustaining by relying on an sCO2 power cycle system 1708 to provide electrical power. In some embodiments, the second working fluid is the same as the first working fluid. In some embodiments, the first and second working fluids are salts.

In some embodiments, the thermal storage system 1706 is located outside a nuclear site boundary 1720. In some embodiments, the energy conversion system 1710 is located outside the nuclear site boundary 1720. In some embodiments, the sCO2 power cycle system is located outside the nuclear site boundary 1720. The nuclear site boundary 1720 may be any suitable boundary, such as those described herein. In some cases, the thermal storage system 1706, the energy conversion system 1710, the sCO2 power cycle system 1708, or a combination of these systems are located outside the EPZ of the heat generating nuclear reactor 1702. In some embodiments, the sCO2 power cycle system 1708 is couple to two or more nuclear reactors 1702 to provide electricity the two or more nuclear reactors independently of the electrical grid.

The embodiments described herein provide for an integrated energy system that decouples the thermal energy source from the energy conversion system, which provides for a modular, scalable, efficient system that can be used to meet base electrical load demands, peak electrical load demands, as well as industrial process heat. One or more thermal energy sources, such as, for example, one or more nuclear reactors of varying types, solar plants, geothermal energy sources, among others, can be coupled to shared balance of plant systems, such as thermal storage and energy conversion systems.

A person of ordinary skill in the art will recognize that any process or method disclosed herein can be modified in many ways. The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed.

The various exemplary methods described and/or illustrated herein may also omit one or more of the steps described or illustrated herein or comprise additional steps in addition to those disclosed. Further, a step of any method as disclosed herein can be combined with any one or more steps of any other method as disclosed herein.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of" Finally, for ease of use, the terms "including" and "having" (and their derivatives), as used in the specification and claims, are interchangeable with and shall have the same meaning as the word "comprising".

As used herein, the term "or" is used inclusively to refer items in the alternative and in combination. As used herein, characters such as numerals refer to like elements.

Embodiments of the present disclosure have been shown and described as set forth herein and are provided by way of example only. One of ordinary skill in the art will recognize numerous adaptations, changes, variations and substitutions without departing from the scope of the present disclosure. Several alternatives and combinations of the embodiments disclosed herein may be utilized without departing from the scope of the present disclosure and the inventions disclosed herein. Therefore, the scope of the presently disclosed inventions shall be defined solely by the scope of the appended claims and the equivalents thereof. This disclosure also includes the following numbered clauses.

1. A system, comprising:
a nuclear reactor, the nuclear reactor located on a nuclear site;
a nuclear site boundary surrounding the nuclear reactor, the nuclear site boundary defined by one or more barriers inhibiting access to the nuclear site;
a thermal energy storage system located outside the nuclear site boundary, the thermal energy storage system in thermal communication with the nuclear reactor; and
a power generator in thermal communication with the thermal energy storage system, the power generator located outside the nuclear site boundary.

2. The system of clause 1, further comprising a containment building, the nuclear reactor enclosed within the containment building.

3. The system of clause 1, further comprising a fuel handling area, the fuel handling area situated within the nuclear site boundary.

4. The system of clause 1, wherein the thermal energy storage system is in thermal communication with the nuclear reactor by an energy transfer system.

5. The system of clause 4, wherein the energy transfer system comprises a fluid loop, the fluid loop creating a closed loop between the nuclear reactor and the thermal energy storage system.

6. The system of clause 5, wherein the fluid loop of the energy transfer system is in thermal communication with the nuclear reactor by a first heat exchanger and in thermal communication with the thermal energy storage system by a second heat exchanger.

7. The system of clause 5, wherein the fluid loop contains a working fluid.

8. The system of clause 7, wherein the working fluid comprises a chloride salt.

9. The system of clause 7, wherein the working fluid comprises a sodium nitrate.

10. The system of clause 7, wherein the working fluid comprises a eutectic solution.

11. The system of clause 7, wherein the working fluid comprises a phase-change material.

12. The system of clause 7, wherein the working fluid comprises a miscibility gap alloy.

13. The system of clause 7, wherein the working fluid comprises a molten metal or metal alloy.

14. The system of clause 6, wherein the first heat exchanger or the second heat exchanger is a shell and tube heat exchanger.

15. The system of clause 6, wherein the first heat exchanger or the second heat exchanger is a double pipe heat exchanger.

16. The system of clause 6, wherein the first heat exchanger or the second heat exchanger is a plate heat exchanger.

17. The system of clause 6, wherein the first heat exchanger is a compact heat exchanger.

18. The system of clause 1, wherein the nuclear site boundary comprises a fence.

19. The system of clause 1, wherein the nuclear reactor is a fast neutron reactor.

20. The system of clause 1, wherein the nuclear reactor is a breeder reactor.

21. The system of clause 1, wherein the nuclear reactor is a thermal neutron reactor.

22. The system of clause 1, wherein the nuclear reactor is a heavy-water nuclear reactor.

23. The system of clause 1, wherein the nuclear reactor is a light-water nuclear reactor.

24. The system of clause 1, wherein the nuclear reactor is a molten salt nuclear reactor.

25. The system of clause 1, wherein the nuclear reactor is a liquid metal cooled reactor.

26. The system of clause 1, wherein the nuclear reactor is a gas cooled nuclear reactor.

27. The system of clause 1, wherein the thermal energy storage system is coupled to an energy conversion system having a thermal power input greater than the nuclear reactor thermal power output.

28. The system of clause 1, wherein the thermal energy storage system is a low-pressure system.

29. The system of clause 28, wherein an energy transport system is configured to transfer thermal energy from the nuclear reactor to the thermal energy storage system.

30. The system of clause 29, wherein the energy transport system is a low-pressure system.

31. The system of clause 1, wherein the power generator is in thermal contact with the thermal energy storage system by an energy delivery system.

32. The system of clause 31 wherein the energy delivery system comprises a closed fluid loop.

33. The system of clause 32, wherein the closed fluid loop contains molten salt.

34. The system of clause 31, wherein the energy delivery system comprises a working fluid that is in direct contact with a thermal storage media within the thermal energy storage system.

35. The system of clause 1, wherein the power generator is a steam turbine.

36. The system of clause 35, wherein the steam turbine converts steam into mechanical work.

37. The system of clause 36, further comprising an electricity generator coupled to the steam turbine by an output shaft of the steam turbine, and the mechanical work causes the electricity generator to create electricity.

38. The system of clause 37, wherein the power generator is configured as a load following power generation system.

39. The system of clause 1, wherein the nuclear reactor is a first nuclear reactor and further comprising a second nuclear reactor.

40. The system of clause 39, wherein the second nuclear reactor is located on a second nuclear site within a second nuclear site boundary, and the thermal energy storage system and the power generator are located outside the second nuclear site boundary.

41. The system of clause 1, further comprising an auxiliary thermal storage system in thermal communication with the nuclear reactor.

42. The system of clause 41, wherein the auxiliary thermal storage system is configured to regulate the inlet temperature of a core of the nuclear reactor.

43. The system of clause 1, further comprising a solar thermal energy system in thermal communication with the thermal energy storage system.

44. The system of clause 1, further comprising an emergency planning zone around the nuclear reactor, and wherein the thermal energy storage system and the power generator are located outside the emergency planning zone.

45. The system of any one of the preceding clauses, wherein the nuclear reactor comprises a reactor vessel; primary coolant loop is disposed at least partially within the reactor vessel; and a primary heat exchanger in thermal communication with the primary coolant loop.

46. The system of clause 45, wherein the primary heat exchanger is a sodium to salt heat exchanger.

47. The system of clause 45, wherein the primary heat exchanger transfers thermal energy from the core to a working fluid of the thermal energy storage system.

48. A system, comprising:
a nuclear reactor within a nuclear site boundary, the nuclear reactor having a reactor vessel;
a heat exchanger within the reactor vessel, the heat exchanger configured to thermally couple a primary coolant within the reactor vessel with a salt coolant in a coolant loop; and
a thermal energy storage system located outside the nuclear site boundary and configured to receive thermal energy from the salt coolant in the coolant loop.

49. The system of clause 48, further comprising a power generation system in thermal communication with the thermal energy storage system, the power generation system located outside the nuclear site boundary.

50. The system of clause 49, wherein the nuclear reactor has a first nameplate capacity and the power generation system has a second nameplate capacity, the second nameplate capacity being larger than the first nameplate capacity.

51. A system, comprising:
a nuclear reactor having a thermal power output; and
a power generation system having a thermal input power in thermal communication with the nuclear reactor;
wherein the thermal input power is greater than the thermal power output.

52. The system of clause 51, further comprising a thermal storage system disposed between the nuclear reactor and the power generation system, the thermal storage system receiving thermal power from the nuclear reactor and delivering thermal power to the power generation system.

53. The system of clause 52, wherein the thermal storage system is sized to deliver a greater amount of thermal power than the nuclear reactor is able to provide.

54. The system of clause 51, further comprising a nuclear site boundary and the nuclear reactor is located within the site boundary.

55. The system of clause 54, wherein the power generation system is located outside the nuclear site boundary.

56. The system as in any previous clause, comprising a primary heat exchanger, wherein the primary heat exchanger is a sodium/salt heat exchanger.

57. The system as in clause 56, wherein the primary heat exchanger is located within a reactor vessel of the nuclear reactor.

58. The system as in clause 57, wherein the primary heat exchanger is in thermal communication with the thermal storage system.

59. The system as in clause 52, further comprising a second nuclear reactor in thermal communication with the thermal storage system.

60. The system as in clause 59, wherein the second nuclear reactor is a different design of reactor than the nuclear reactor.

61. The system as in clause 52, further comprising a solar thermal plant in thermal communication with the thermal storage system.

62. The system as in clause 52, further comprising a wind thermal plant in thermal communication with the thermal storage system.

63. The system as in any previous clause, wherein the nuclear reactor is decoupled from the thermal storage system and the power generation system.

64. The system as in any previous clause, further comprising a hydrogen generator that receives thermal energy to generate hydrogen.

65. The system as in clause 64, wherein the hydrogen generator comprises an electrolyzer.

66. The system as in clause 65, wherein the hydrogen generator generates hydrogen through a high temperature electrolysis process.

67. They system as in clause 64, wherein the hydrogen generator generates hydrogen through a steam reforming process on natural gas.

What is claimed is:
1. A system, comprising:
a sodium cooled fast spectrum nuclear reactor, the nuclear reactor comprising a reactor vessel and a sodium to salt plate heat exchanger within the reactor vessel, the nuclear reactor on a nuclear site and having a first nameplate capacity;
a nuclear site boundary surrounding the nuclear reactor, the nuclear site boundary defined by one or more barriers inhibiting access to the nuclear site;
a thermal energy storage system located outside the nuclear site boundary, the thermal energy storage system in thermal communication with the nuclear reactor and comprising a salt working fluid;
a fluid loop extending between the thermal energy storage system and the sodium to salt plate heat exchanger within the reactor vessel, the fluid loop configured to carry the salt working fluid; and a power generator in thermal communication with the thermal energy storage system, the power generator situated outside the nuclear site boundary and having a second nameplate capacity, the second nameplate capacity greater than the first nameplate capacity of the nuclear reactor.

2. The system of claim 1, wherein the thermal energy storage system is in thermal communication with the nuclear reactor by an energy transfer system.

3. The system of claim 2, wherein the energy transfer system comprises the fluid loop, the fluid loop creating a closed loop between the nuclear reactor and the thermal energy storage system.

4. The system of claim 3, wherein the fluid loop is in thermal communication with the nuclear reactor by the sodium to salt plate heat exchanger and is in thermal communication with the thermal energy storage system by a second heat exchanger.

5. The system of claim 4, wherein the fluid loop contains salt as a working fluid.

6. The system of claim 1, wherein the nuclear site boundary comprises a fence.

7. The system of claim 1, wherein the thermal energy storage system has a thermal energy storage capacity that is greater than the first nameplate capacity of the nuclear reactor.

8. The system of claim 1, wherein the power generator is in thermal contact with the thermal energy storage system by an energy delivery system utilizing molten salt as a working fluid.

9. The system of claim 1, wherein the nuclear reactor is a first nuclear reactor and further comprising a second nuclear reactor in thermal communication with the thermal energy storage system.

10. The system of claim 9, wherein the second nuclear reactor is located on a second nuclear site within a second nuclear site boundary, and the thermal energy storage system and the power generator are located outside the second nuclear site boundary.

11. The system of claim 1, further comprising a solar thermal energy system in thermal communication with the thermal energy storage system.

12. The system of claim 1, further comprising an emergency planning zone around the nuclear reactor, and wherein the thermal energy storage system and the power generator are located outside the emergency planning zone.

13. The system of claim 1, wherein the nuclear reactor comprises:

a primary sodium coolant loop disposed within the reactor vessel; and wherein the sodium to salt plate heat exchanger is in thermal communication with the primary sodium coolant loop.

14. The system of claim 13, wherein the sodium to salt heat exchanger is located within an upper half of the reactor vessel.

* * * * *